Feb. 17, 1970      W. EMIG ET AL      3,495,600

CIGAR SHAPING AND TIPPING APPARATUS

Filed March 7, 1968      15 Sheets-Sheet 1

INVENTORS
WERNER EMIG
ROY HOGLUND
GUSTAV E. CARLSON
BY
ATTORNEY

Feb. 17, 1970  W. EMIG ET AL  3,495,600

CIGAR SHAPING AND TIPPING APPARATUS

Filed March 7, 1968  15 Sheets-Sheet 3

INVENTORS
WERNER EMIG
ROY HOGLUND
BY GUSTAV E. CARLSON

William R. Lieberman

ATTORNEY

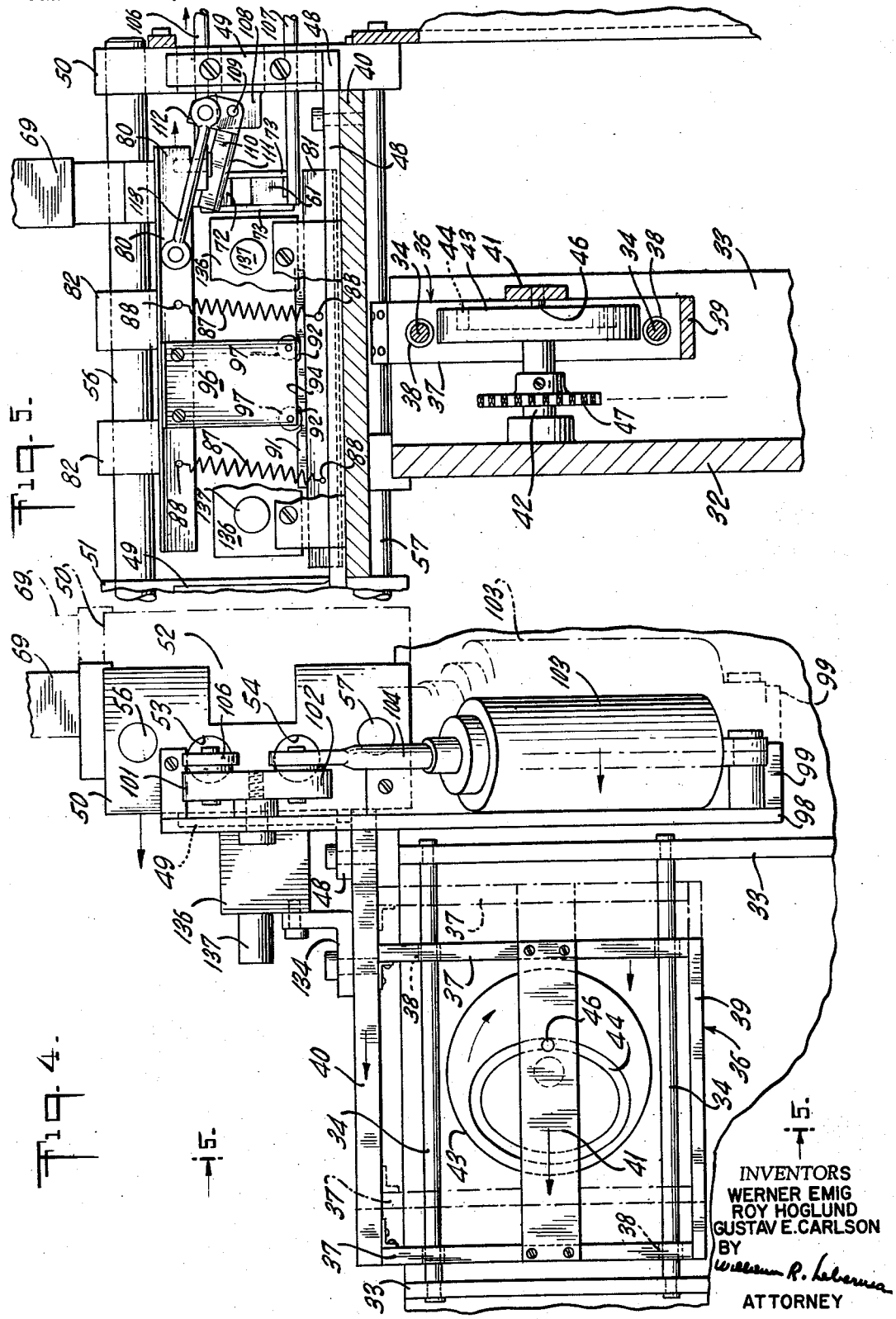

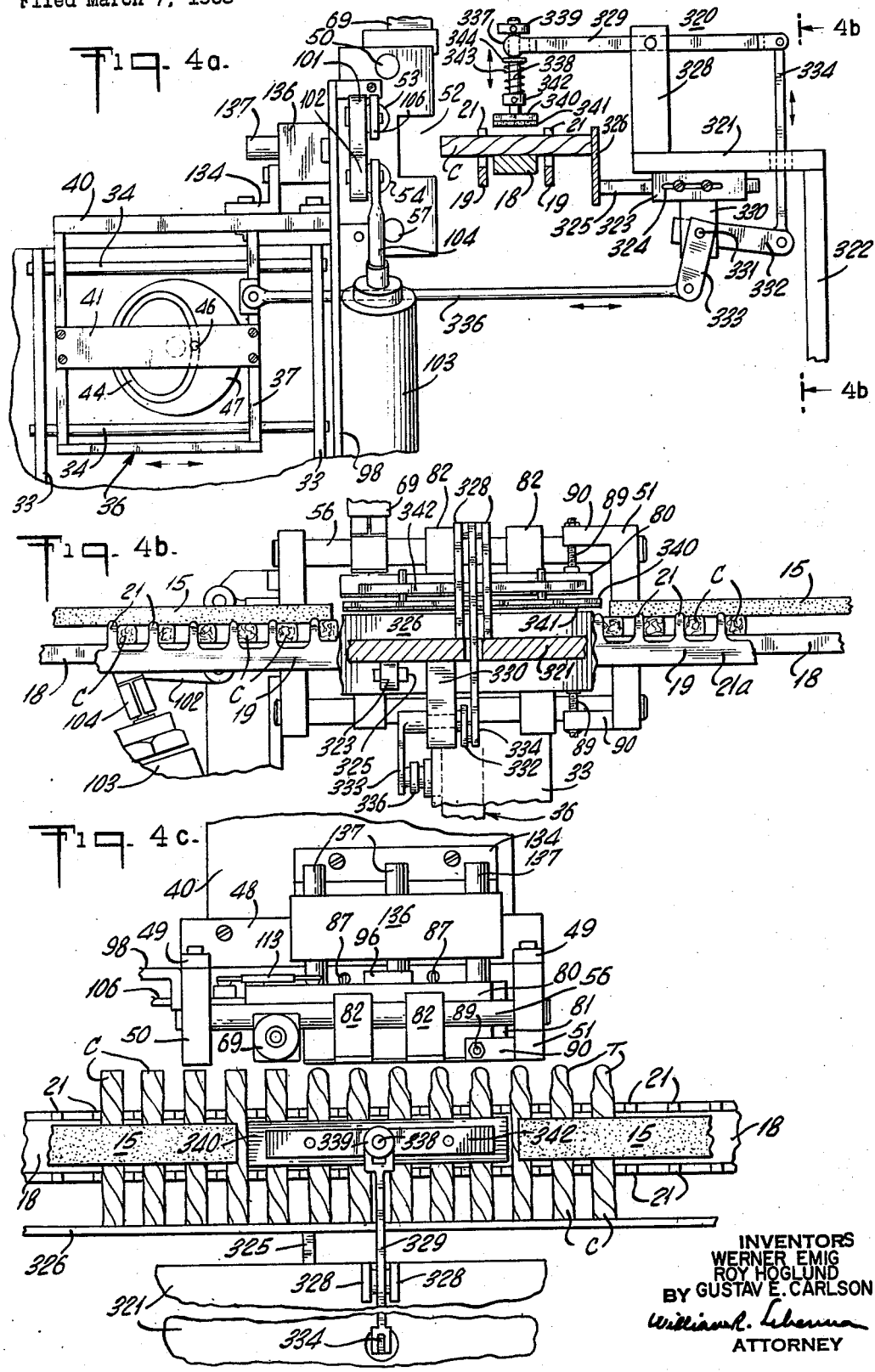

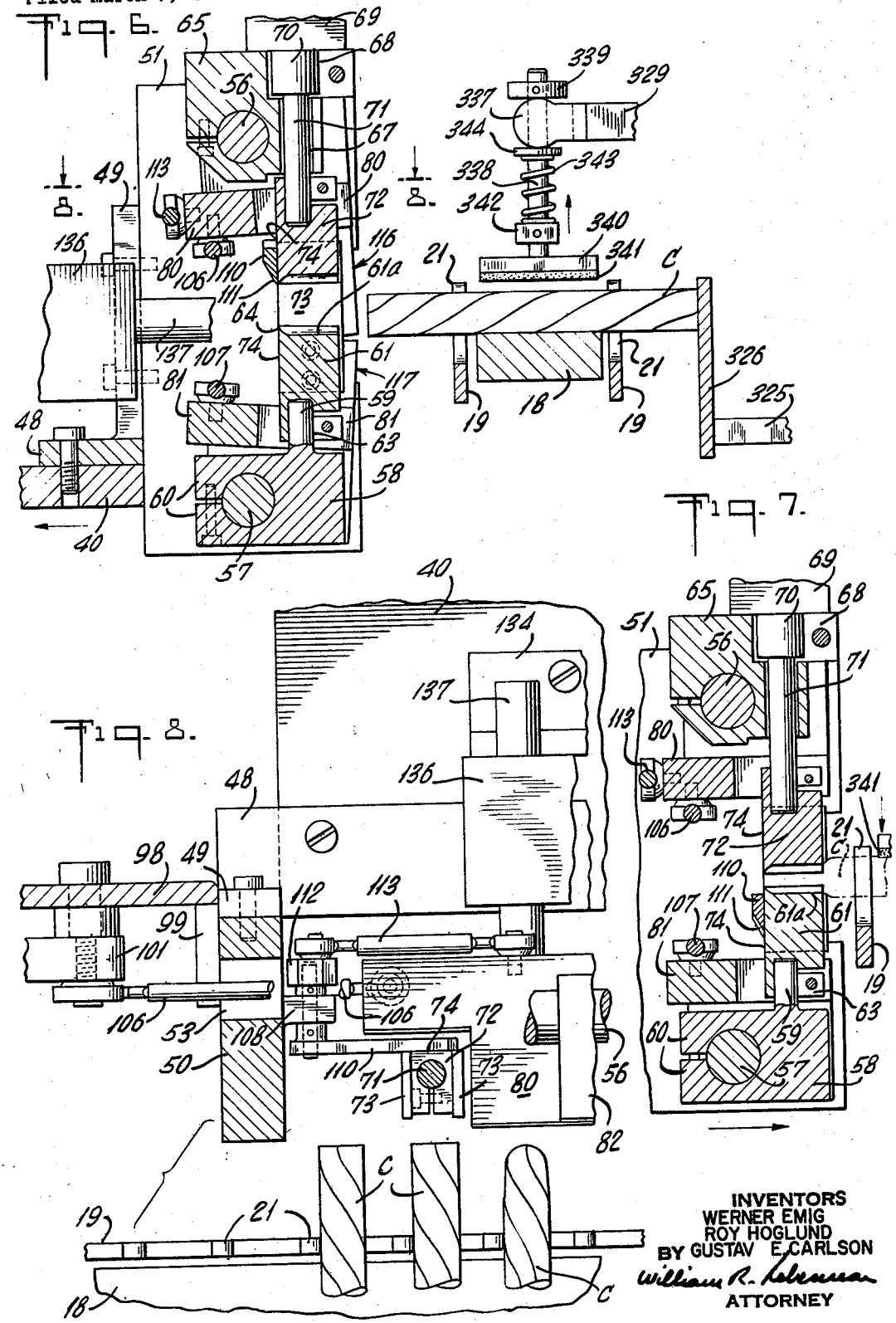

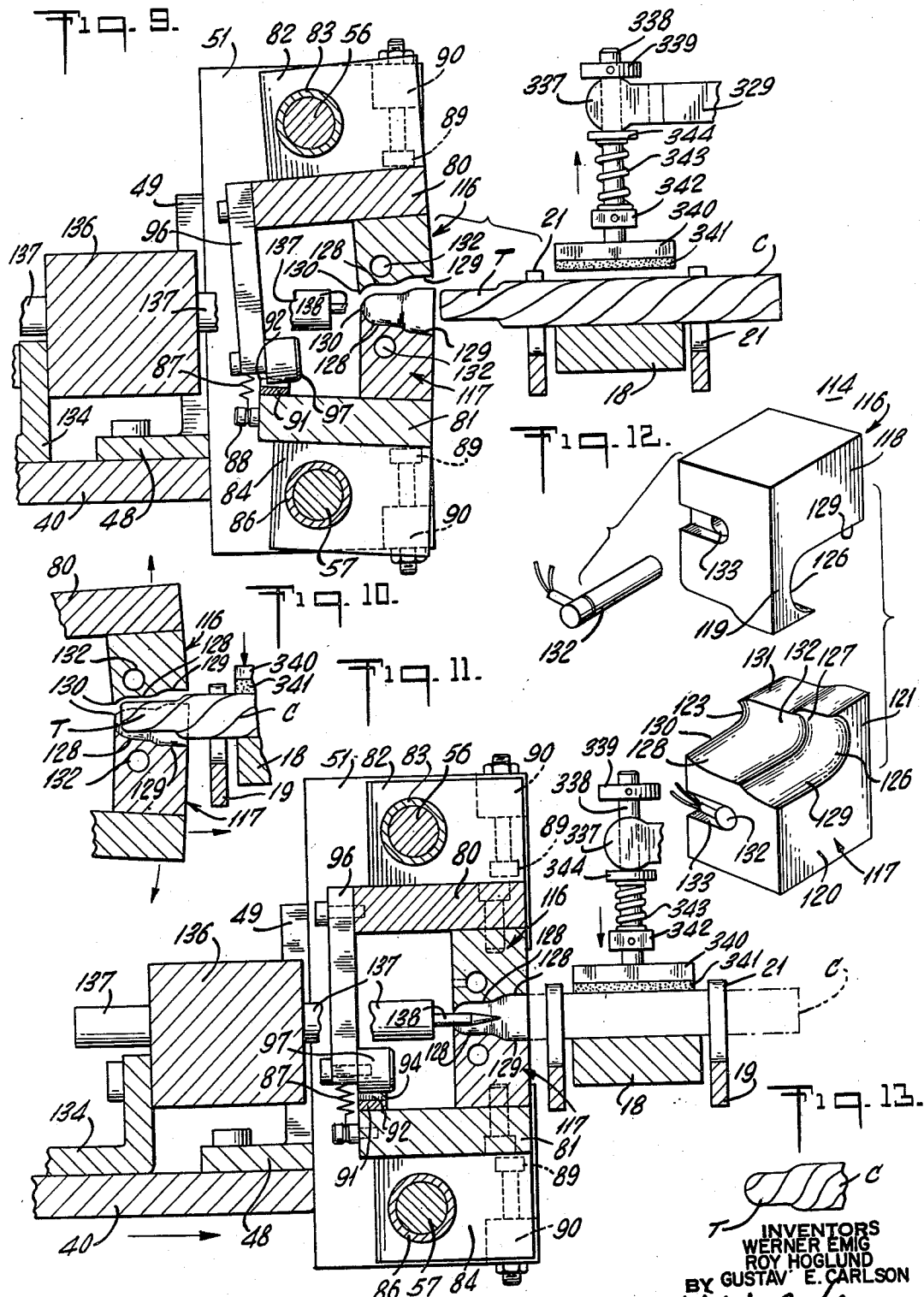

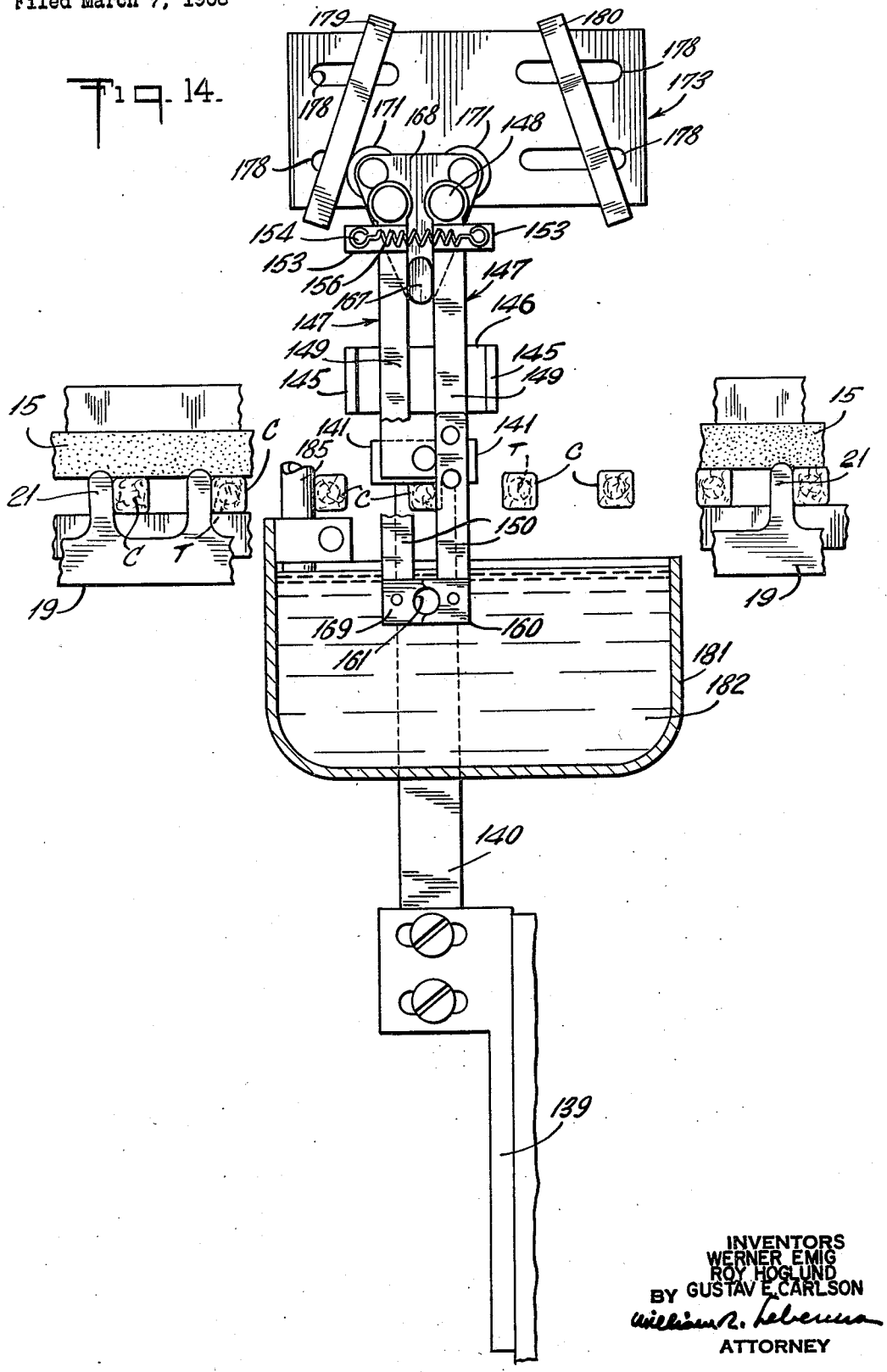

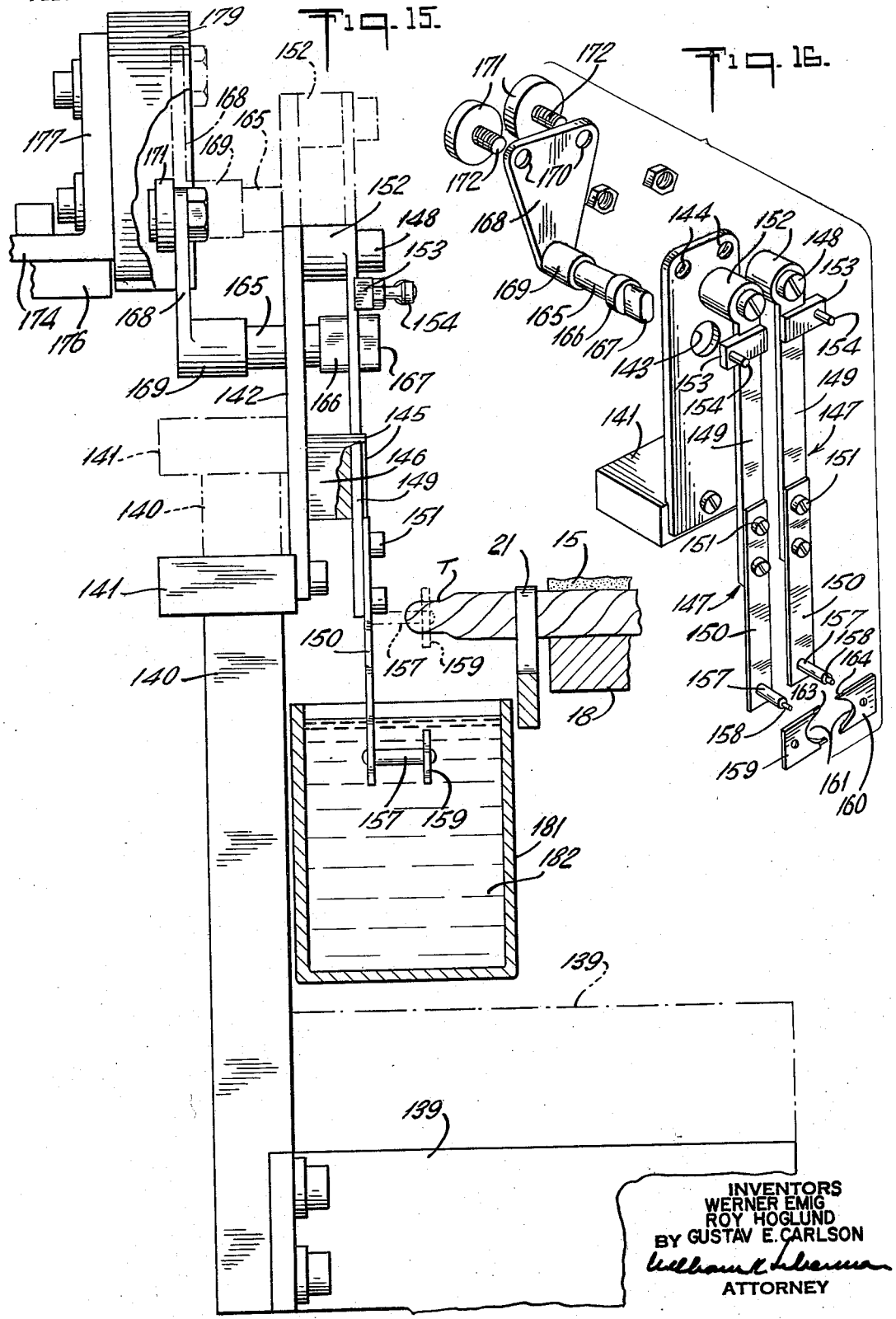

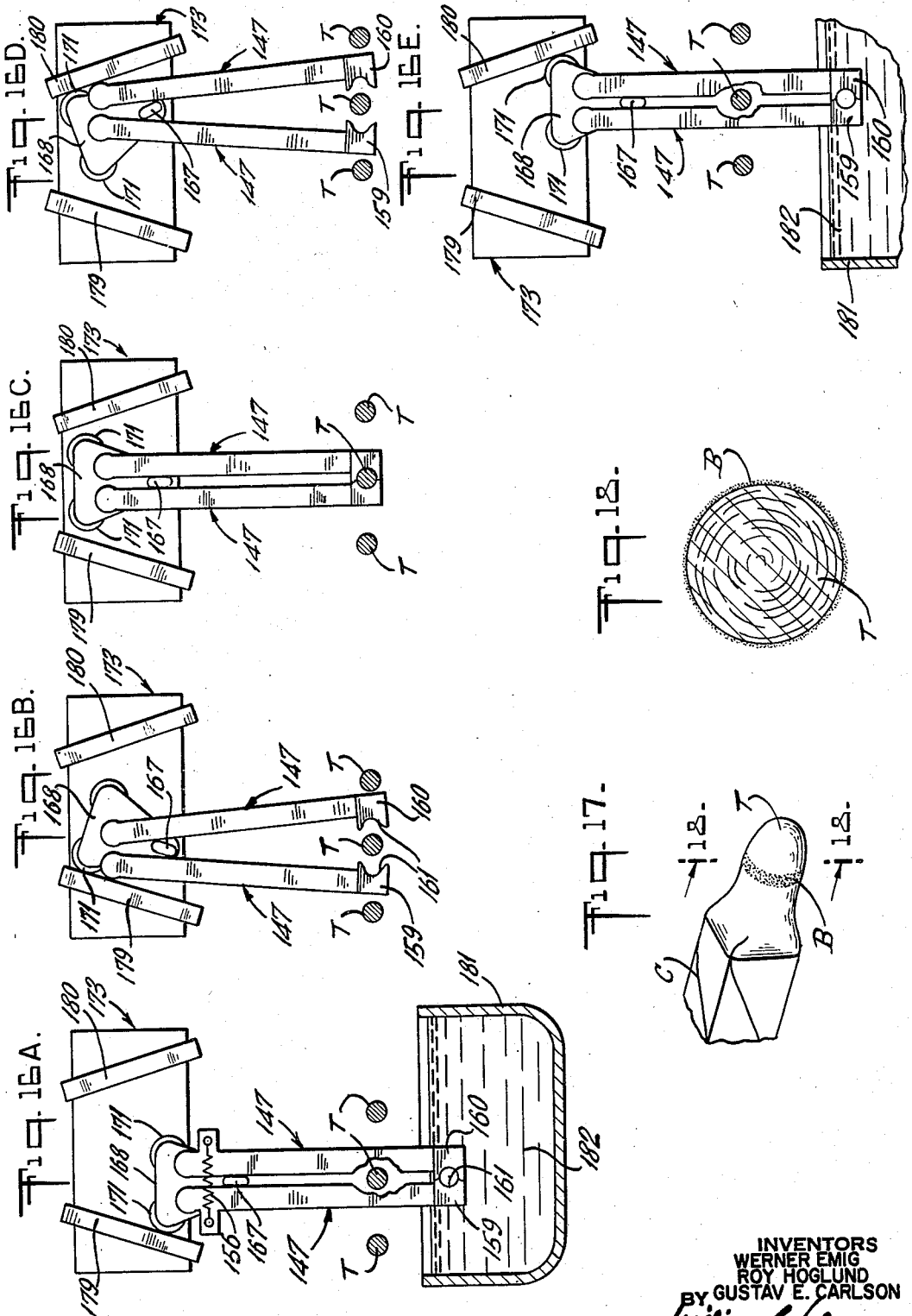

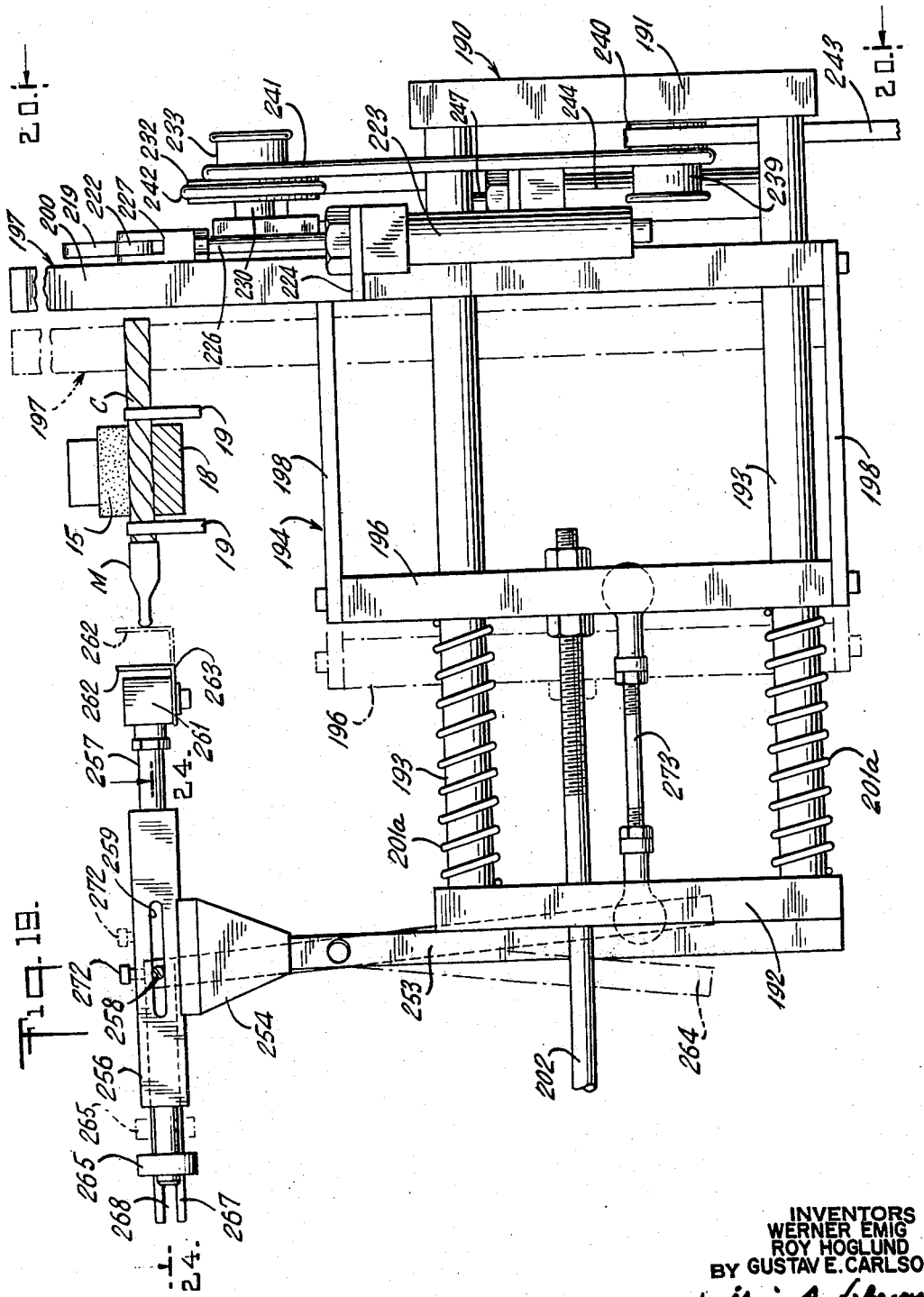

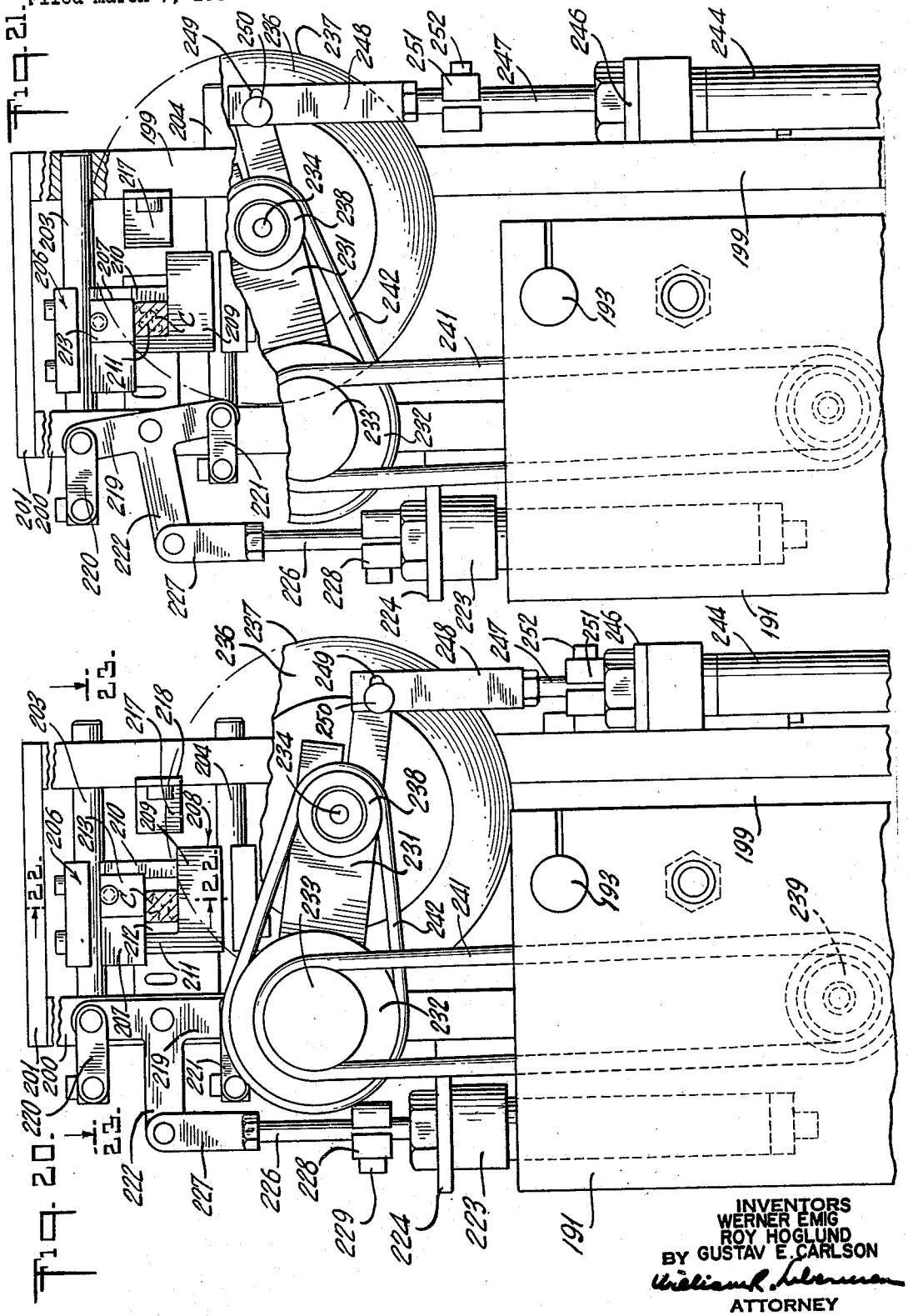

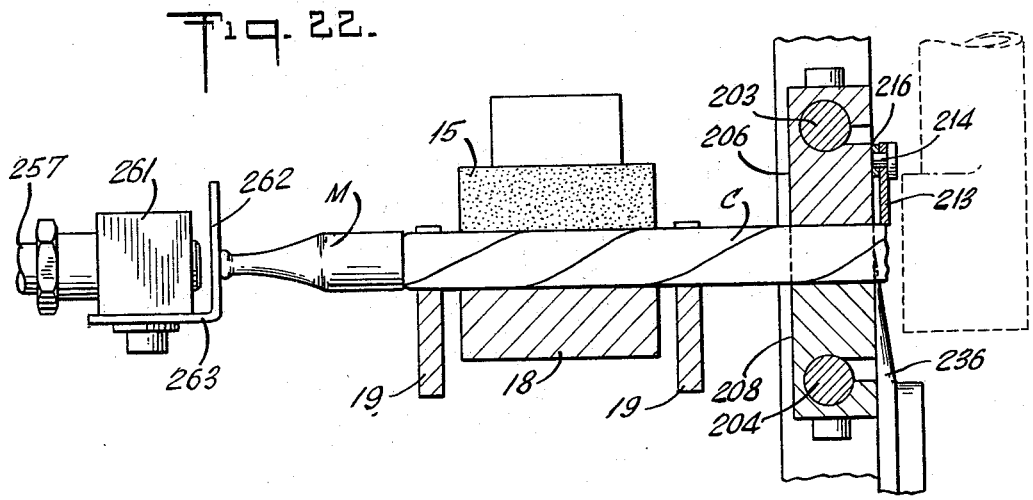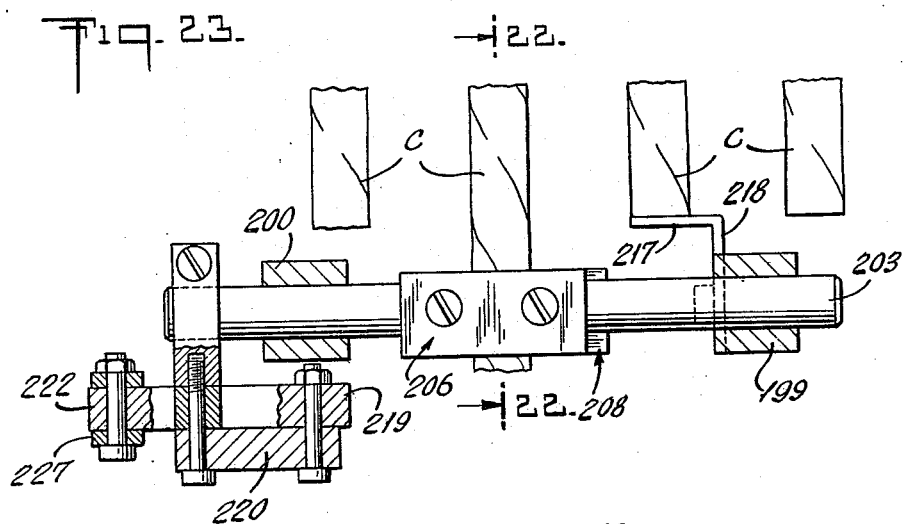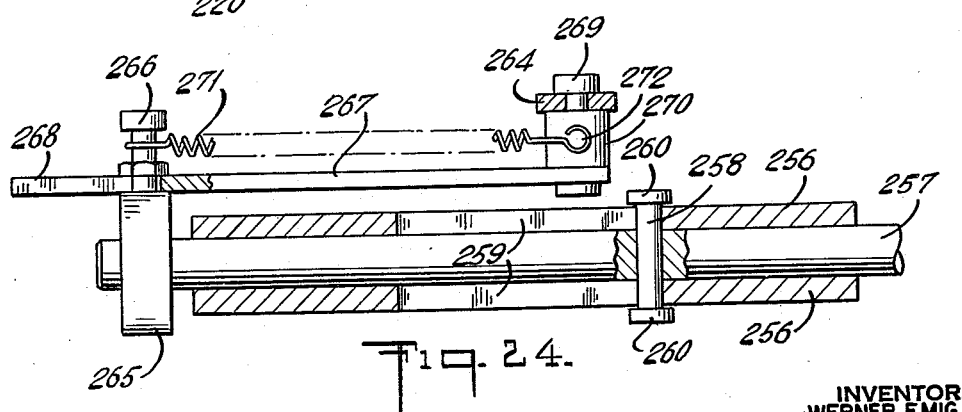

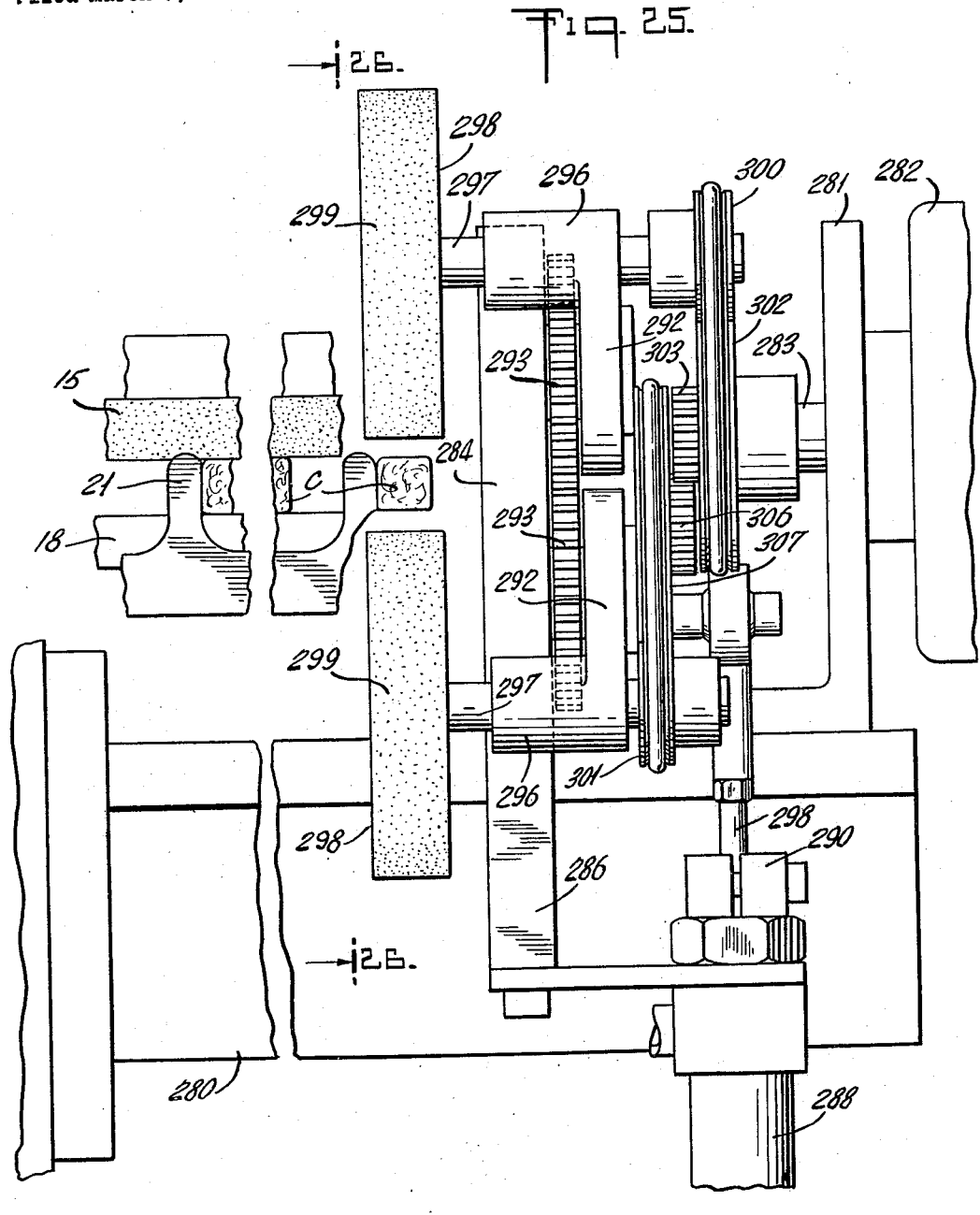

Feb. 17, 1970    W. EMIG ET AL    3,495,600
CIGAR SHAPING AND TIPPING APPARATUS
Filed March 7, 1968    15 Sheets-Sheet 15

INVENTORS
WERNER EMIG
ROY HOGLUND
BY GUSTAV E. CARLSON

William Liberman
ATTORNEY

3,495,600
CIGAR SHAPING AND TIPPING APPARATUS
Werner Emig, Red Lion, Roy Hoglund, Mifflinville, and Gustav E. Carlson, Wyoming, Pa., assignors to Consolidated Cigar Corporation, New York, N.Y., a corporation of Delaware
Filed Mar. 7, 1968, Ser. No. 711,319
Int. Cl. A24c 1/32, 1/34, 1/36
U.S. Cl. 131—88   15 Claims

ABSTRACT OF THE DISCLOSURE

A plurality of longitudinally spaced transversely extending cigars are intermittently advanced along a longitudinal path successively through stations for the end crushing and end shaping, adhesive applying, mouthpiece applying, end trimming and mouthpiece attachment testing. At the crushing and shaping station, crushing jaws and a plurality of sets of compression jaws are transversely advanced into registry with respective cigar ends, closed and opened, and the jaws transversely retracted. The compression jaws are heated and piercing needles are located in the cigars during their compression. At the adhesive applying station, a pair of curved applicator members are immersed in an underlying adhesive tank raised to the cigar level, closed about a cigar end and advanced with the cigar and spread as the cigar approaches the end of an advance increment, and the applicator members are then lowered and longitudinally returned. A mouthpiece is then applied to the cigar and the tipped cigar is advanced to the trimming station where it is axially moved by a gauging member into registry with clamp jaws which are then closed and a rotating disc blade is moved across the jaw face to trim the free end of the cigar. At the testing station, a pair of rotating bristle brush wheels are brought into engagement with opposite faces of the mouthpiece to apply a pull thereon and separate inadequately secured mouthpieces.

BACKGROUND OF THE INVENTION

The present invention relates generally to improvements in the production of cigars and the like and it relates particularly to an improved method and apparatus for the shaping, trimming and sizing of a cigar and the application of a mouthpiece thereto.

It is common practice to manufacture and distribute cigars with mouthpieces attached to the individual cigars, the tipped cigars being generally packaged in small groups for dispensing and handling. The mouthpieces are conventionally formed of a thermoplastic polymer such as polyethylene and are applied to the cigars in a continuous manner by known apparatus such as those described in U.S. Patents No. 2,981,262, granted Apr. 25, 1961, to Farkas, and No. 3,097,654, granted July 16, 1963, to Carlson. While the equipments described in these patents are generally satisfactory for tipping many types of cigars, they possess many disadvantages when employed with certain types of cigars. In U.S. Patent No. 3,152,595, granted Oct. 13, 1964, to Silberman, there is described a method and apparatus for the continuous production of cigars. It has been found that the conventional procedure of applying mouthpieces to cigars of this nature has many drawbacks. The mouthpieces are frequently not firmly attached to the cigars and are easily separated therefrom; the structure of the cigar is often damaged; the tipped cigars are not uniformly sized and are of an overall configuration which adversely affects the packaging of the cigar and the appearance thereof and otherwise leaves much to be desired.

SUMMARY OF THE INVENTION

It is a principal object of the present invention to provide an improved method and apparatus for the production of cigars and the like.

Another object of the present invention is to provide an improved method and apparatus for the application of mouthpieces to cigars and the like.

Still another object of the present invention is to provide an improved method and apparatus for the shaping of formed cigars.

A further object of the present invention is to provide an improved mechanism for the application of adhesive to a cigar for securing a mouthpiece thereto.

Still a further object of the present invention is to provide an improved mechanism for the sizing and trimming of cigars and the like.

Another object of the present invention is to provide an improved mechanism for testing the securement of a mouthpiece to a cigar.

Still another object of the present invention is to provide an improved method and apparatus of the above nature characterized by reliability, efficiency, versatility and adaptability.

The above and other objects of the present invention will become apparent from a reading of the following description taken in conjunction with the accompanying drawings which illustrate a preferred embodiment of the improved apparatus.

In a sense the present invention contemplates the provision of a method and apparatus for reducing the transverse cross section of an end section of a cigar by compression and release of the pressure and for thereafter applying a mouthpiece to the reduced diameter end section. The cigar is advantageously heated during the compression step by heating the jaws employed in effecting the compression, the cigar being repeatedly compressed and released, a piercing needle being temporarily inserted in the cigar during the compression thereof, and the end of the cigar being crushed to a flattened condition prior to the compression shaping thereof. The preferred procedure involving the crushing, shaping, application of adhesive and mouthpieces, and the sizing, trimming and testing of the tipped cigars, is effected in a continuous manner; the cigars being intermittently advanced along a longitudinal platform at regularly spaced intervals and extending transversely supported by the platform. Following the shaping of the cigar end, adhesive is applied around its circumference; a mouthpiece is applied; the tipped cigar is sized and trimmed; and a pull is then applied to the mouthpiece to test its securement.

In accordance with a preferred form of the improved apparatus, the crushing jaws and a plurality of longitudinally spaced sets of compression shaping jaws are mounted on a common frame which is transversely advanced during the rest period of the intermittently advanced cigars to engage corresponding cigars whereupon the jaws are closed and opened and the frame and jaw sets retracted. The adhesive applicator includes a pair of confronting concave arcuate applicator elements and a mechanism for lowering the elements into an underlying adhesive carrying tank; raising the separated elements to the cigar level during the cigar rest period; moving the elements longitudinally with the cigar and closing them about the cigar to apply the adhesive thereto and then opening the elements during the cigar advance; and then lowering and retracting the applicator elements during the cigar rest period. The mechanism for sizing and trimming the cigars includes a transversely movable support frame carrying clamping jaws and a rotating disc knife blade which is movable across end vertical faces of the jaws, a transversely movable gauging member, and a mechanism for transversely moving the gauging member and frame toward each other as a cigar comes to rest in registry therewith accurately to locate the free end section of the cigar in the jaws which are then closed and the knife blade actuated to trim the cigar end. Following the trimming of the cigar, the jaws are opened and the frame and gauging member are separated. The trimmed cigar is then transported with its tip between a pair of wire wheels which are moved into engagement with the opposite faces of the mouthpiece during the cigar rest period to apply a pull thereon relative to the cigar.

The improved apparatus operates in a reliable and efficient manner at a relatively high speed. The tipped cigars are of high quality, good construction and uniform size, the mouthpieces being firmly secured to the cigars and so related thereto to permit the simple and attractive packaging of the cigars.

BRIEF DESCRIPTION OF THE DRAWINGS

FIGURE 4 is a fragmented end elevational view taken along the line 4—4 in FIGURE 2;

FIGURE 4a is a reduced view similar to FIGURE 4, illustrating the cigar clamping mechanism;

FIGURE 4b is a sectional view taken along line 4b—4b in FIGURE 4a;

FIGURE 4c is a plan view of FIGURE 4a;

FIGURE 5 is a sectional view taken along line 5—5 in FIGURE 4;

FIGURE 6 is a sectional view taken along line 6—6 in FIGURE 2;

FIGURE 7 is a fragmentary view similar to FIGURE 6, the crushing jaws being shown in a closed condition;

FIGURE 8 is a sectional view taken along line 8—8 in FIGURE 6;

FIGURE 9 is a sectional view taken along line 9—9 in FIGURE 2;

FIGURE 10 is a fragmentary view similar to FIGURE 9 illustrating the compression jaws in an advanced position;

FIGURE 11 is a view similar to FIGURE 9, the compression jaws being illustrated in a closed condition;

FIGURE 12 is an exploded perspective view of a compression jaw set;

FIGURE 13 is a side view of the end section of a shaped cigar;

FIGURE 14 is a fragmented front elevational view of the adhesive applying mechanism;

FIGURE 15 is a fragmented end view thereof;

FIGURE 16 is an exploded front perspective view of the adhesive applying assembly;

FIGURES 16A to 16E are front elevational views of the adhesive applicator assembly illustrated in successive positions of an adhesive applying cycle;

FIGURE 17 is a perspective view of the adhesive carrying cigar end section;

FIGURE 18 is a sectional view taken along line 18—18 in FIGURE 17;

FIGURE 19 is an end view of the cigar sizing and trimming mechanism shown by full line in a retracted position and by broken line in an advanced position;

FIGURE 20 is a front elevational view taken along line 20—20 in FIGURE 19;

FIGURE 21 is a view similar to FIGURE 20 illustrating the mechanism at the termination of the sizing and trimming operation;

FIGURE 22 is a sectional view taken along line 22—22 in FIGURES 20 and 23;

FIGURE 23 is a sectional view taken along line 23—23 in FIGURE 20;

FIGURE 24 is a sectional view taken along line 24—24 in FIGURE 19;

FIGURE 25 is a front elevational view of the mouthpiece attachment testing mechanism shown in an open condition;

DESCRIPTION OF THE PREFERRED EMBODIMENT

Figure 1:
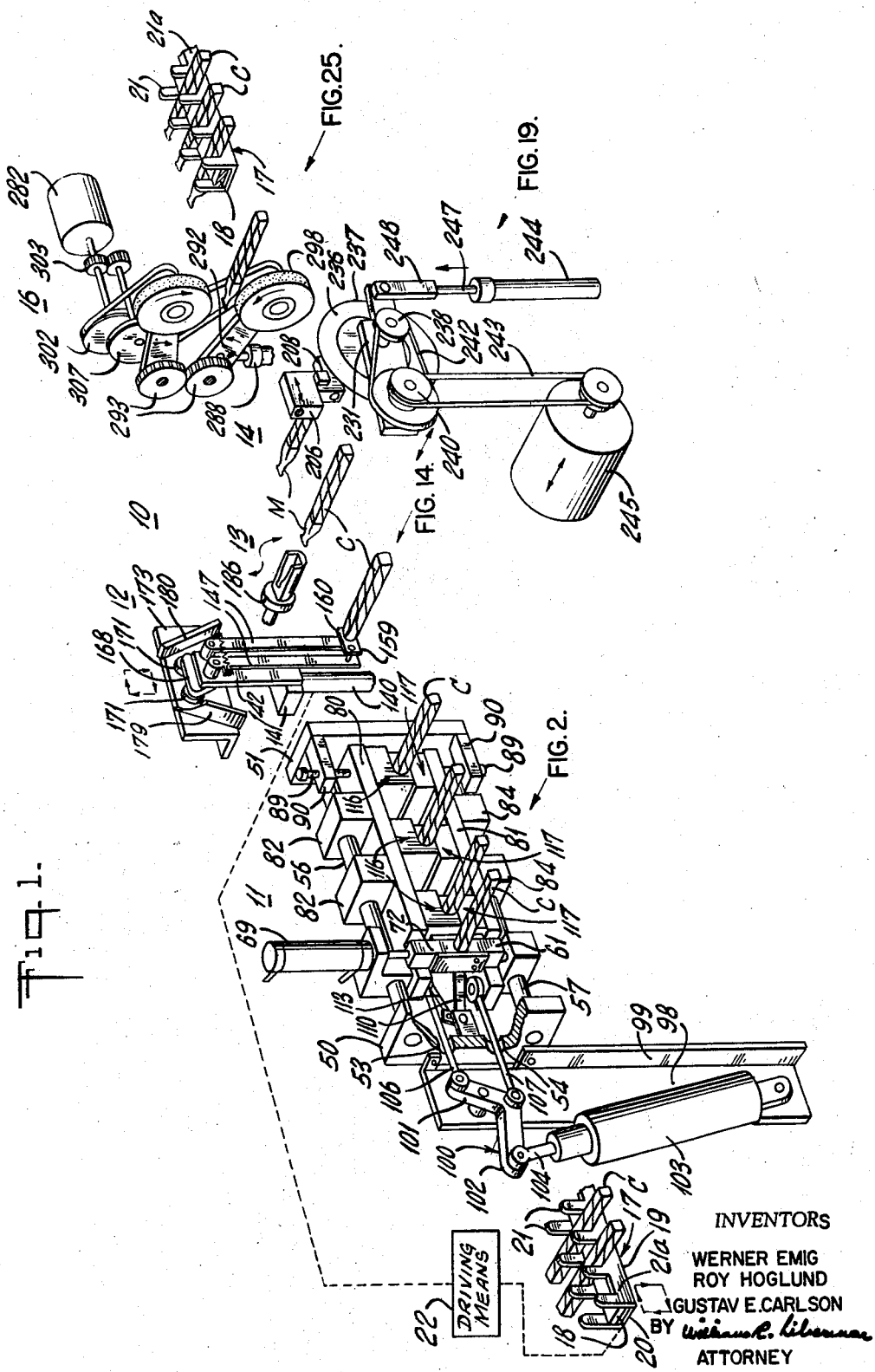
FIGURE 1 is a front diagrammatic fragmented perspective view of an apparatus embodying the present invention.

Referring now to the drawings which illustrate a preferred embodiment of the apparatus of the present invention, reference numeral 10 generally designates the improved apparatus as applied to the shaping, tipping, sizing, trimming and testing of cigars C which are initially of uniform square transverse cross-section and may be produced by the equipment described in the above-identified Silberman patent and pressed to a square cross-section in any known manner. The apparatus 10 includes longitudinally spaced stations in which are successively positioned a cigar end section shaping mechanism 11, an adhesive applying mechanism 12, a mouthpiece applying machine 13, a cigar sizing and trimming mechanism 14, and a mouthpiece attachment testing mechanism 16. A conveyor 17 of known construction intermittently longitudinally advances cigars C in regularly longitudinally spaced relationship and extending transversely and parallel to each other from a trailing feed end through the successive stations containing the mechanisms and machines 11, 12, 13, 14 and 16 to a leading end where treated cigars C are discharged for further handling.

Conveyor 17 includes a suitably supported horizontal bar or narrow platform 18 which extends for the length of the apparatus 10 and bears cigars C. A suitably backed soft resilient rubber pad 15 is supported above and is coextensive with the platform 18 except in the area of the mechanism 11, along the length of which pad 15 is interrupted. Pad 15 is spaced above platform 18 a distance about the height of a cigar C whereby to resist any undesirable movement thereof. A cigar advancing rake member 19 includes a cross web 20 underlying and substantially coextensive with platform 18 and is provided along its side edges with upright parallel flanges 21a having integrally formed along their upper edges regularly longitudinally spaced upwardly projecting vertical fingers 21, fingers 21 along opposite flanges 21a being in transverse alignment. A driving means 22 of known construction successively advances rake 19 when in its raised position an increment equal to about the center-to-center spacing of fingers 21, lowers rake 19 when in its raised position an increment equal to about the center-to-center spacing of fingers 21, lowers rake 19 to a bottom position with fingers 21 below the level of the platform 18, retracts rake 19 an increment and then raises rake 19 so that fingers 21 just trail the next successive respective trailing cigars C, the motion of the rake being shown by the arrows at the left of FIGURE 1. Cigars C rest on platform 18 in a stationary condition between the successive advance movements of rake member 19.

The cigar tip shaping mechanism is best seen in FIGURES 1 to 12 of the drawings, and includes a suitably mounted support frame comprising a transversely extending vertical plate 32 provided along its front and adjacent its rear edges with parallel vertical flanges 33. A pair of vertically spaced horizontal transverse parallel cylindrical rails 34 extend between and are supported by flanges 33. A slide carriage frame 36 includes a pair of front and rear parallel vertical legs 37 which have circular openings formed therein holding corresponding slide bushings 38 which slidably engage rails 34. The bottoms of frame legs 37 are connected by a transverse leg 39 and the tops of frame legs 37 are secured by angle members to the underface of a horizontal mounting plate 40 along the transverse medial axis thereof. Mounting plate 40 projects forwardly of front frame leg 37. The trailing edges of frame legs 37 at about their midpoints are joined by a transversely extending horizontal bar 41 secured to frame legs 37 by suitable screw bolts.

A longitudinal shaft 42 is suitably journalled to plate 32 at the level of bar 41 and has affixed to its free end shortly behind bar 41 a cam 43. Cam 43 has an elliptical cam groove 44 formed therein eccentric to the shaft 42, and a follower pin 46 projects from and is affixed to the bar 41 and engages cam groove 44. Shaft 42 has affixed thereto a sprocket wheel 47 which is coupled by a sprocket chain to a uniformly driven sprocket wheel synchronized with the rake drive 22 and is so phased relative to rake 17 that cam 43 locates carriage frame 36 and plate 40 in their forwardmost positions during the rest periods of cigars C.

A cigar clamping mechanism 320 (FIGURES 4 to 11) extends along the length of tip crushing and shaping mechanism 11 forward of cigar platform 18 and includes a longitudinally extending horizontal base plate 321 suitably supported on legs 322 at the level and forward of platform 18. Depending transversely extending brackets 323 are affixed to the underface of the plate 321 and have elongated transverse slots 324 formed thereon. Rearwardly projecting transverse arms 325 are secured to brackets 323 by lock screws registering with slots 324 and engaging arms 325 to permit their transverse adjustment. A longitudinally extending vertical guide plate 326 is affixed to the rear ends of the arms 325 and is adjustable therewith. Guide plate 326 extends below and above the level of the top face of platform 18 and serves to transversely position cigars C conveyed along the platform 18 and extends to a point short of trimming mechanism 14.

An upwardly directed post 328 is positioned on the top rear face of plate 321 and rockably supports at its top a transversely extending lever 329 intermediate the ends thereof for swinging about a longitudinal axis. A bracket 330 depends from the underface of plate 321 and has a horizontal longitudinal shaft 331 journalled therein; one end of shaft 331 having a forwardly directed radial arm 332 affixed thereto and the other end of the shaft having a depending radial arm 333 affixed thereto perpendicular to arm 332. The forward ends of lever 329 and arm 332 are joined by a connecting rod 334 the ends of which are pivotally connected to lever 329 and arm 332 and a transverse connection rod 336 is pivotally connected at opposite ends thereof to the free end of the arm 333 and carriage frame leg 37 respectively.

A vertical sleeve member 337 is mounted in the rear end of the lever 329 and is slidably engaged by a vertical rod 338, the upper end of which is engaged by a suitably axially adjustable collar 339 which limits the lower movement of the slide rod 338. A longitudinally extending horizontal backing plate 340 is secured to the bottom of slide rod 338 and is spaced above and extends parallel to and along the length of platform 18 for the length of the cigar tip shaping mechanism 11 and is of the same width as the platform 18. A resilient soft rubber pad 341 is coextensive with and is secured to the underface of plate 340. A collar 342 is affixed to the lower end section of slide rod 338 and a helical compression spring 343 engages slide rod 338 and is entrapped between collar 342 and a washer 344 engaging slide rod 338 directly below sleeve 337 resiliently to urge slide rod 338 and the pad member defined by backing plate 340 and rubber pad 341 downwardly relative to the lever supported sleeve 337. Thus, with the movement of frame member 36 forwardly and rearwardly, pad 341 is lowered and raised respectively correspondingly to restrain and release the underlying cigars C.

A bracket is mounted on the front top face of the plate 40 and includes a base 48 extending longitudinally along and bolted to plate 40 and provided at its opposite ends with integrally formed longitudinally spaced upwardly directed vertical legs 49. A pair of opposite transverse parallel vertical end plates 50 and 51 are bolted to and project forwardly of legs 49 and extend above and below the legs 49. Each of plates 50 and 51 has a rectangular recess 52 medially formed in the front edge thereof and the trailing plate 50 has a pair of vertically spaced upper and lower apertures 53 and 54 formed therein shortly forward of its rear edge. A pair of upper and lower fixed parallel horizontal cylindrical bars 56 and 57 respectively extend longitudinally between and are supported by end plates 50 and 51 and are positioned above and below respectively and shortly forward of apertures 53 and 54.

The cigar tip crushing assembly, as best seen in FIGURES 6 to 8, includes a mounting block 58 located on bar 57 forward of end plate 50 and provided with an integrally formed upwardly directed vertical mounting pin 59. Block 58 has a longitudinal bore engaging the bar 57 and is clamped thereto by screw tightening a pair of legs 60 formed from the block 58 and projecting rearwardly from the bore therein. A first jaw defining block 61 is mounted on pin 59 and has a vertical split coupling collar 63 formed thereon and engaging pin 59 and screw tightened thereto. A transversely extending shallow arcuate channel 61a is formed in the upper face of the jaw 61 and terminates at its rear in an upwardly projecting lip 64.

A mounting block 65 is located on upper bar 56 and is provided with an integral horizontal split coupling collar engaging the upper bar 56 and screw tightened thereto. Block 65 has a vertical bore 67 in vertical axial alignment with pin 59, the upper part of the block 65 being provided with a self formed vertical split coupling collar 68 coaxial with bore 67. Mounted atop block 65 is a vertical hydraulic cylinder 69 provided with a fixed bottom sleeve 70 engaged by the split collar 68 which is tightened thereto. A cylinder actuated piston rod 71 projects from cylinder 69 coaxially through bore 67 and has affixed to its bottom end a second jaw 72 of a construction similar to first-mentioned jaw 61 having a self formed split collar tightly engaging the piston rod 71. A groove and lip are formed in the underface of the jaw 72 of the same shape and confronting groove 63 and lip 64. A pair of parallel vertical guide plates 73 (FIGURE 2) are secured to the side walls of the lower jaw block 61 and project upwardly into sliding engagement with the corresponding side walls of the upper jaw block 72. The rear faces 74 of jaw blocks 61 and 72 are flat and lie in a common vertical longitudinal plane.

Referring now to FIGURES 1 to 5 and 9 to 12 of the drawings illustrating the compression section of the cigar tip shaping assembly, a pair of upper and lower substantially horizontal mounting plates 80 and 81 respectively extend longitudinally between end plates 50 and 51 and are rockably and slidably supported by the upper and lower rods 56 and 57 respectively. Upper plate 80 has a pair of longitudinally spaced blocks 82 positioned on its top face, said blocks 82 having coaxial longitudinal bores formed therein provided with bushings 83 rotatably and slidably engaging rod 56. Similarly, lower plate 81 has a pair of longitudinally spaced blocks 84 affixed to its underface, said blocks 84 being provided with bore carrying bushings 86 rotatably and slidably engaging rod 57.

Figure 2:
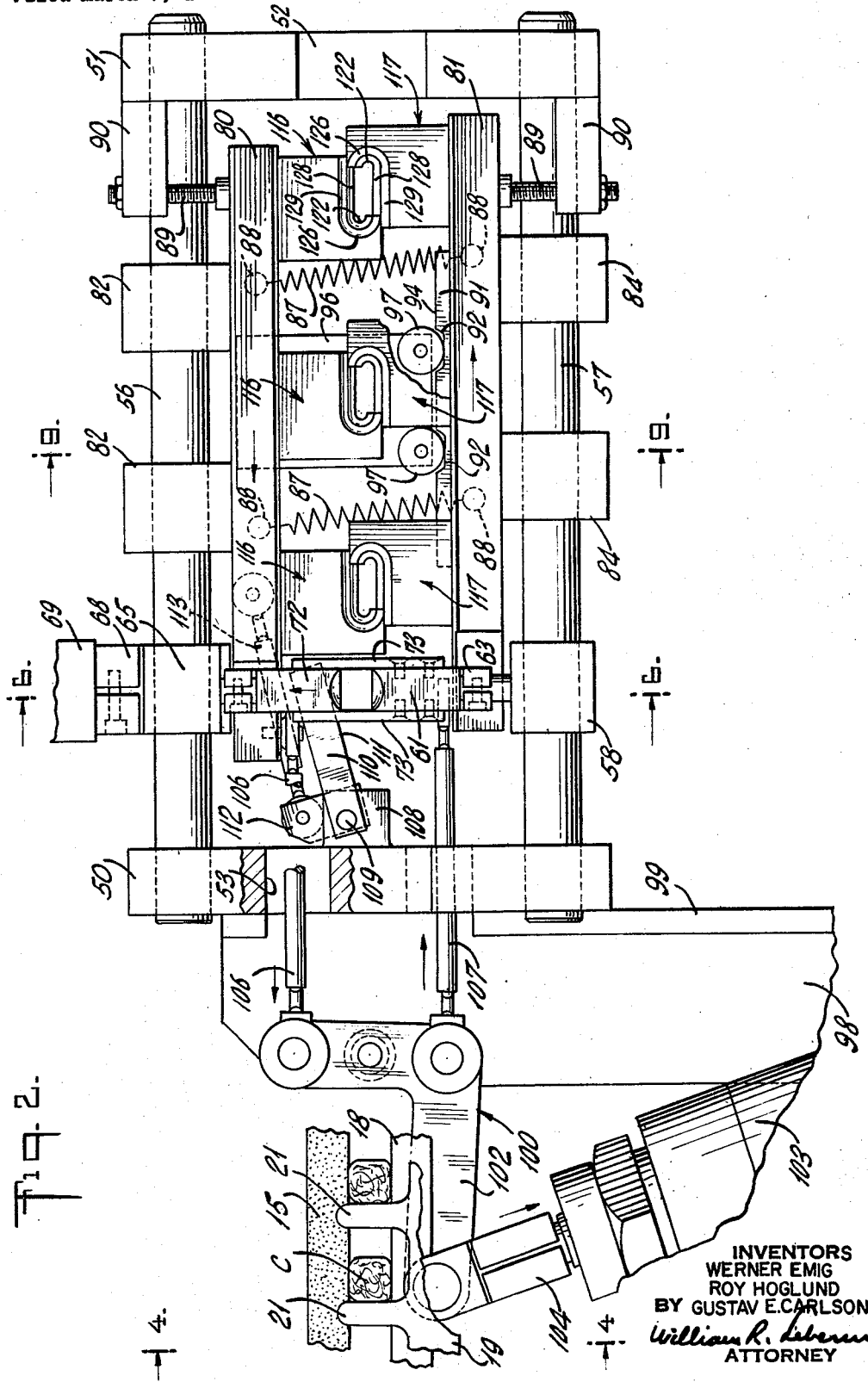
FIGURE 2 is a fragmented front elevational view of the cigar tip crushing and compression section thereof, illustrated in a jaw open condition.

A pair of longitudinally spaced vertical helical tension springs 87 are connected between corresponding pins 88 projecting from the rear faces of plates 80 and 81. These normally rock or urge plates 80 and 81 to open, mutually forwardly diverging positions with their front sections relatively spread as illustrated in FIGURES 2 and 9. The open spread positions of plates 80 and 81 are limited by adjustable stop elements 89 in the form of vertical screws provided with lock nuts and engaging tapped vertical bores formed in horizontal arms 90 positioned at the upper and lower front corners of the leading end plate 51. Stop members 89 are located above and below the upper and lower leading front corners respectively of rocker plates 80 and 81 and their open position may be varied by vertically adjusting screws 89.

Figure 3:
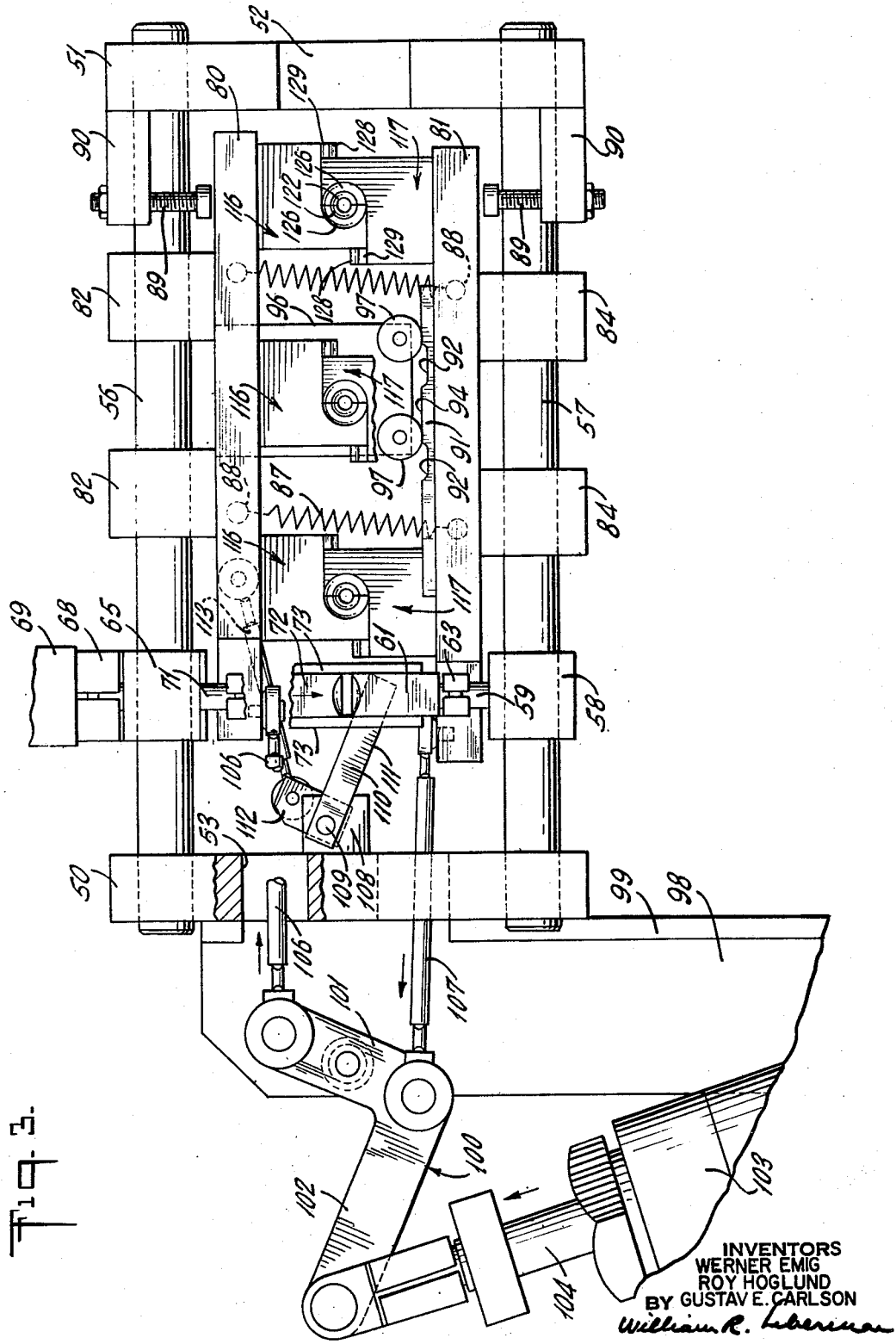
FIGURE 3 is a view similar to FIGURE 2 illustrating the jaws in a closed condition.
Figure 26:
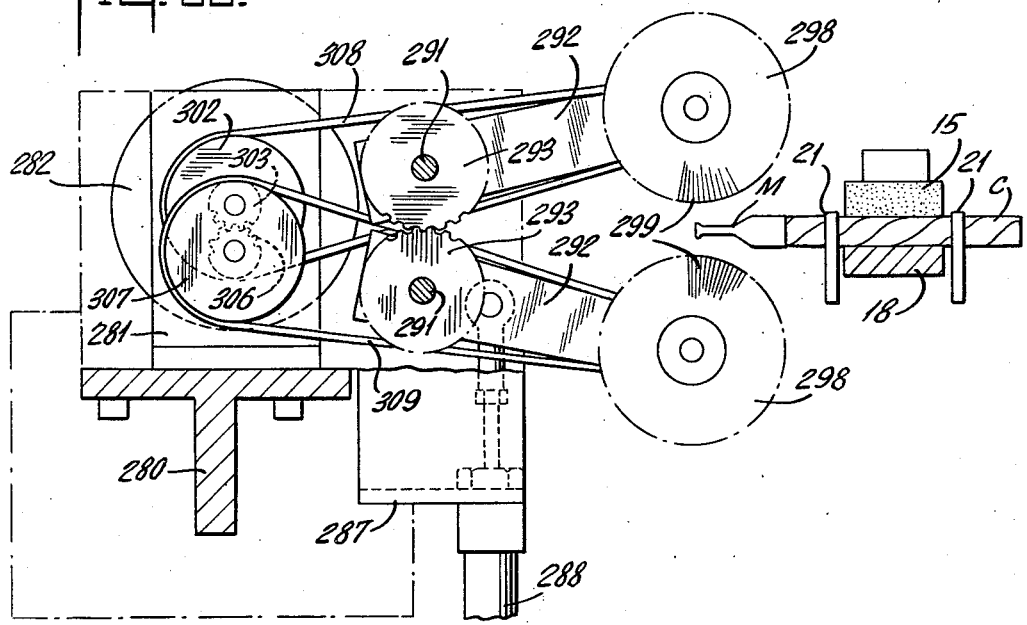
FIGURE 26 is a sectional view taken along line 26—26 in FIGURE 25.

A longitudinally extending cam member 91 is mounted atop lower rocker plate 81 adjacent and parallel to its rear edge and is provided with a pair of longitudinally spaced depressed cam sections 92, the remainder of cam member 91 constituting sections 94 raised to a common level above depressed sections 92. Secured to and depending from the rear face of upper rocker plate 80 is a follower plate 96 provided at its lower corners with a pair of longitudinally spaced rotatable cam follower wheels 97 engaging cam member 91, the center to center spacing between the follower wheels 97 being equal to that between depressed cam sections 92. Thus, when plates 80 and 81 are relatively longitudinally slid along rods 56 and 57 to a position in which follower wheels 97 engage depressed cam sections 92, springs 87 rock plates 80 and 81 to a front spread open position. When plates 80 and 81 are slid to positions where follower wheels 97 engage cam raised sections 94, plates 80 and 81 are rocked by follower wheels 97 and plate 96 to a closed position, as shown in FIGURES 3 and 11.

In order to effect the opening and closing of plates 80 and 81 there is provided a hydraulic cylinder actuating assembly including a vertical longitudinal mounting bracket or plate 98 depending from end plate 50 and secured to the outer face thereof through a transverse flange 99 formed along an edge of the plate. A bell crank 100 includes an angularly joined upwardly directed arm 101 and a rearwardly directed arm 102, crank 100 being pivotally mounted at a point intermediate the ends of the crank arm 101 to the upper part of the mounting plate 98 for rocking about a transverse axis. A hydraulic actuating cylinder 103 is pivotaly connected at its lower end to a lower part of mounting plate 98 for rocking about a transverse axis and is provided with a piston having a piston rod 104 pin connected by means of a coupling yoke to the free end of crank arm 102.

The upper free end of crank arm 101 is coupled by a longitudinal connecting rod 106 of adjustable length to the trailing rear underface of rocker plate 80. The trailing end of connecting rod 106 is coupled to the crank arm 102 for rocking about a transverse axis and extends through the end plate upper opening 53 and is universally coupled at its leading end to plate 80 by a ball joint or the like. The lower elbow end of crank arm 101 is coupled by a longitudinal connecting rod 107 of adjustable length to the trailing rear upper face of rocker plate 81. The trailing end of the connecting rod 107 is coupled to the crank arm 102 for rocking about a transverse axis and extends through the end plate lower opening 54 and is universally coupled at its leading end to rocker slide plate 81. Thus, when piston rod 104 is in its retracted position as seen in FIGURE 2, rocker slide plates 80 and 81 are in their angular and longitudinal open positions; and when hydraulic cylinder 103 is actuated to advance the piston rod 104 to its extended position as shown in FIGURE 3, rocker slide plates 80 and 81 are in their angular and longitudinal closed positions.

A bracket 108 is positioned on the rear inner face of end plate 50 intermediate the top and bottom thereof and has a transverse shaft 109 journalled therein. A knife blade 110 is affixed at its trailing end to shaft 109 for rocking therewith and has a flat front face coinciding with the plane of the rear faces 74 of the crusher jaw blocks 61 and 72 (see FIGURE 6), and a sharp bottom cutting edge 111 also lying in said plane. An upwardly directed crank arm 112 is affixed to and rotatable with shaft 109 and is perpendicular to knife blade 110. The upper free end of crank arm 112 is coupled by a connecting rod 113 of adjustable length to the trailing rear face of the rocker plate 80, the ends of connecting rod 113 being connected to the crank arm 112 and rocker plate 80 by universal couplings. Thus, with the longitudinal movement of rocker plate 80 toward its closed position, knife blade 110 is swung downwardly along the rear faces 74 of jaw blocks 72 and 61 to the position shown in FIGURE 3 and upon the return longitudinal movement of rocker plate 80 toward its open position, knife blade 110 is swung upwardly to the position shown in FIGURE 2. It should be noted that cylinders 69 and 103 are timed to advance the respective piston rods 71 and 104 in a known manner; first to advance piston rod 71 and close smashing jaws 61 and 72; then to advance piston 104 to close rocker plates 80 and 81 and swing knife 110 downwardly; and thereafter piston rod 104 is retracted to open rocker plates 80 and 81 and retract knife blade 110 to its raised position; and piston rod 71 is raised to open jaw blocks 61 and 72; whereafter the carriage support frame 36 is retracted by cam 43.

Mounted on the front confronting faces of the rocker plates 80 and 81 are longitudinally spaced sets 114 of upper and lower complementary compression jaws 116 and 117 respectively, suitably secured to the rocker plates 80 and 81. The longitudinal center to center spacing between successive jaw sets 114 and between the trailing jaw set 114 and the crusher jaws 61 and 62, is an integral multiple of one or more of the increment distance of advance of cigars C for each cycle of rake members 19. Upper jaw member 116 includes an upper base section 118 provided at its trailing part with a depending section 119, and lower jaw member 117 includes a bottom base section 120 provided at its leading part with an upwardly directed section 121. Formed in the inner face of jaw section 121 are a rear transversely extending semicylindrical groove 122 terminating in an inwardly tapering end section 123 and a front transversely extending semicylindrical groove 126 coaxial with and of greater diameter than groove 122 and joined thereto by a curved shoulder 127. The top face of jaw base section 120 has longitudinally extending upper and lower guide surfaces 128 and 129 formed therein tangential to the bottom faces of grooves 122 and 126 respectively, the rear border of surface 128 being provided with upwardly directed lip 130 corresponding to tapered section 123. Top face 131 of jaw section 121 is shaped to mate guide surfaces 128 and 129.

Upper jaw 116 has grooves formed in the inner face of depending section 119 similar in configuration to grooves 122 and 126 formed in jaw section 121, and guide surfaces formed in the under faces of the jaw sections 118 and 119 similar in configuration to the guide surfaces 128, 129 and 131 of jaw member 117. Jaw members 116 and 117 of each set 114 thereof are so dimensioned and related that when rocker plates 80 and 81 are in their fully closed position, as described above, the guide surfaces on the jaw sections 121 and 119 slidably matingly engage the guide surfaces on jaw base sections 118 and 120 respectively, and the confronting faces of closed jaw sections 119 and 120 delineate a cigar tip shaping cavity having a larger diameter front cylindrical section with a transverse area cross section substantially equal to that of a cigar C and a smaller diameter rear cylindrical section approximately equal to that of the desired diameter of the shaped tip of the cigar for the reception of a mouthpiece. As rocker plates 80 and 81 move from their open to closed positions, they move separated jaws 116 and 117 of each set longitudinally toward each other initially then concurrently longitudinally and vertically toward each other until the guide surfaces are in mutual engagement, and then longitudinally toward each other to a fully closed position. The above sequence is reversed in the opening of the jaw sets.

Each of jaws 116 and 117 is heated by an electrical heating element 132, which may be thermostatically controlled, housed in a longitudinal cavity 133 formed in each of the jaw base sections 118, 120, the heating elements being suitably connected to a source of current. Jaws 116 and 117 are advantageously maintained at a temperature between 100° and 300°, the particular temperature depending on the condition of the tobacco and the diameter of the cigar being treated.

Mounted on the top face of carriage plate 40, rearwardly of the front edge thereof, is an angle bracket 134 which supports a longitudinally extending mounting block 136, having formed therein transverse bores in axial alignment with the respective longitudinal axes of compression jaw sets 114. A tubular member 137 axially adjustably registers with and projects through and is secured in each of the transverse bores in block 136 and houses a heating element which may be thermostatically controlled and is suitably connected to a source of current. Tubular members 137 extend forwardly to points short of the respective jaw sets 114 and axially support forwardly projecting piercing needles 138 extending axially for the full lengths of tip forming jaws cavities of reduced diameter and into the space between the larger and smaller diameter cavities. Needles 138 are heated by the associated heating elements and pierce the corresponding cigars C with the advance of carriage frame 36, and the compression jaws are open and are held on cigars C during the opening and closing the compression jaw sets 114, and the compression jaws are closed and are withdrawn with the retraction of the carriage frame 36.

The mechanism 12 for applying adhesive to cigar tips, FIGURES 1 and 14 to 18, follows the cigar tip shaping mechanism along the path of cigars C and includes a transversely extending bottom mounting bracket 139 positioned below the level of the cigar path and drive coupled to the cigar advancing rake member 19 to be driven substantially simultaneously therewith, successively vertically upwardly, longitudinally forwardly, vertically downwardly and longitudinally rearwardly, the forward and rearward movements being equal to the increment of advance of the cigars C. Mounted on the rear of and longitudinally adjustable along bracket 139 behind the cigars C is a vertical post 140 extending to above the level of the cigars C and having affixed to the top thereof a block 141. A vertical monuting plate 142 is secured to the front face of block 141 and projects upwardly therefrom. Formed in the medial upper part of plate 142 is a circular opening 143 and formed in the upper corners thereof are tapped bores 144. A guide block 146 is medially positioned on the lower front face of plate 142 and has a flat vertical front wall bordered on its sides with forwardly projecting lips 145.

A pair of forwardly projecting pivot screws 148 engage tapped bores 144. A pair of elongated arms 147 depend from and are swingably supported by pivot screws 148, and each arm 147 includes co-linear upper and lower sections 149 and 150, respectively, with overlapping end sections joined to each other by screws 151, arms 149 and 150 being preferably relatively adjustable along their lengths. Upper arm sections 149 are provided with integrally formed rearwardly projecting collars 152 which engage the pivots 148. A pair of horizontal longitudinal arms 153 are affixed to the front faces of upper arm sections 149 slightly below the collars 152 and are preferably suitably longitudinally adjustable toward and away from each other. Located on the outer front faces of arms 153 are forwardly projecting pins 154 which are engaged by looped ends of a helical tension spring 156 which normally resiliently swings the lower ends of arms 147 toward each other.

Arms 147 lie and are swingable in a vertical plane rearwardly of the ends of cigar C, and a pair of forwardly directed horizontal posts 157 are positioned at the bottoms of lower arm sections 150 and are provided with short end sections 158 of reduced diameter and delineated at their bases by annular shoulders. A pair of complimentary applicator elements or plates 159 and 160 have openings which engage post sections 158 and are firmly rigidly secured thereto. Each applicator element 159 and 160 has a semicircular recess 161 formed in its inner face, the outer ends of the recesses 161 delineating with the corresponding inner upper and lower edges of applicator elements 159 and 160 inwardly directed fingers 163 and 164 respectively. The front faces of fingers 163 are recessed to half the thickness of plate 159 and the rear faces of the fingers 164 are similarly recessed. Thus, when the applicator elements are swung to their closed position under the influence of spring 156 the front faces of the fingers 163 and the rear faces of the fingers 164 are contiguous and the recesses 161 form a circular opening of a diameter approximately equal to or slightly less than that of the reduced tip T of cigar C. Applicator elements 159 and 160 lie and are movable in a vertical longitudinal plane across the cigar tip T approximately intermediate the front and rear ends thereof.

A traverse shaft 165 is journalled in opening 143 and projects beyond opposite sides of plate 142 and is suitably restricted against any axial movement. Shaft 165 is provided at its front with an enlarged circular head 166 which is contiguous to the rear faces of upper arm sections 149. Concentrically formed on the front face of the head 166 is a forwardly directed vertically elongated spreader or cam block 167 having flat parallel side faces and curved convex top and bottom faces. Spreader block 167 is positioned between and engaged by the opposing faces of the arm sections 149, so that when the spreader block 167 is vertically oriented arms 147 and applicator elements 159 and 160 are released to be urged by spring 156 to their closed positions, and when angularly oriented about its axis spreader block 167 separates arms 147 and applicator elements 159, 160 to their open positions in which applicator fingers 163 and 164 are separated a distance greater than the width of cigar tip T.

Affixed to the rear end of the shaft 165 is a triangular rocker plate 168 provided at its bottom apex with a forwardly projecting sleeve 169 engaging and affixed to shaft 165 and at its upper corners with openings 170. Wheel followers 171 are positioned at and project beyond the upper corners of plate 168 and are connected thereto by threaded shanks 172 projecting axially from followers 171 into registry with openings 170 and secured therein by nuts engaging the threaded shank 172.

A stationary cam 173 is mounted on a stationary platform 176 at the level of followers 171. Cam member 173 includes a longitudinal vertical plate 177 having upper and lower horizontal longitudinally spaced aligned slots 178 formed therein and provided along its bottom edge with a rearwardly directed flange 174 secured to platform 176. Longitudinally spaced upwardly converging trailing and leading cam bars 179 and 180 are mounted on the front face of plate 177 by means of screws registering with the slots 178 and engaging tapped bores in the rear faces of the cam bars 179 whereby to permit the independent longitudinal adjustment of the cam bars. Located directly below the cigar tip T and in vertical alignment with applicator elements 159 and 160 is an open tapped longitudinally extending receptacle 181 containing a suitable fluid adhesive 182 of known composition which is maintained at a constant level by a feed pipe 185.

Arms 147 and applicator elements 159 and 160, spreader block 167, followers 171 and cam bars 179 and 180 are so relatively positioned and oriented that when post 140 and rake 19 are in their longitudinally retracted bottom positions as shown in FIGURES 14, 15 and 16A, the trailing follower 171 engages the bottom section of cam bar 179 whereby arms 147 are spring urged to their contracted position and the applicator elements are closed and immersed in the fluid adhesive 182. With the raising of rake 19 and post 140, arms 147 and applicator elements 159 and 160 are raised and trailing follower 171 rides to the upper part of the cam bar 179 to rock plate 168 and spreader block 167 clockwise thereby to spread arms 147 and fully to open applicator elements 159 and 160 as they approach their raised position at the level of the cigar tip T, as shown in FIGURE 16B. Post 140, plate 168 and arms 147 then advance concurrently with rake 19 and cigars C and at the beginning of such advance, the trailing follower 171 leaves cam bar 179 to permit and effect the contraction of arms 143 under the influence of the spring 156 and the rocking of the plate 168 and spreader block 167 to their vertically oriented positions, as in FIGURE 16C. As a consequence, applicator elements 159 and 160 close into circumferential engagement with a reigstering cigar tip T, advancing with cigar tip T and applying a band of adhesive 182 thereto which is picked up by the applicator elements 159 and 160 from the supply tank 181. As plate 168 and arms 147 approach the end of their longitudinal advance with rake 19 the leading follower 171 engages the upper inner face of cam bar 180 to swing the rocker plate 168 and spreader block 167 counterclockwise and thereby to spread arms 147 to open the applicator elements 159 and 160, as shown FIGURE 16D, to leave an adhesive band B about the full circumference of the cigar tip T. Rocker plate 168 and arms 147 are then lowered and with such lowering the leading follower 171 rides along the forwardly inclined face of cam bar 180 to permit and effect the return of arms 147 to their contracted position and the rocker plate 168 and spreader block 167 to their vertically oriented positions. Applicator elements 159 and 160 return to their closed position below the cigar tip T and are lowered into the adhesive 182 as shown in FIGURE 16E and the various components are then longitudinally retracted to the initial position shown in FIGURE 16A to complete a cycle; the closed applicator elements 159 and 160 traversing their return path immersed in fluid adhesive 182.

Following the adhesive applying mechanism 12 is the mouthpiece attaching machine 13 which includes a rotating axially reciprocating mouthpiece applicator 186. The mouthpiece attaching mechanism is of the construction described in the above-identified Farkas and Carlson patents and is synchronized with the cigar advancing mechanism in the manner therein explained to attach mouthpieces M to the reduced cigar tip T. Mouthpieces M are of known construction and preferably formed of polyethylene or the like.

The cigar sizing and trimming mechanism 14 follows the mouthpiece applicator 13, as seen in FIGURES 1 and 19 to 24, and includes a transversely extending support frame 190 positioned below the path of the mouthpiece carrying cigars C. The support frame 190 includes transversely spaced parallel front and rear end plates 191 and 192, respectively, of rectangular configuration. A pair of upper and lower parallel rail rods 193 extend transversely between the upper and lower leading corners of plates 191 and 192 and are firmly secured thereto.

A carriage assembly 194 is slidably supported by rails 193 and includes a rear end plate 196 having transverse bores slidably engaging the rails, a front vertical mounting frame 197 and parallel transverse parallel upper and lower members 198 rigidly connecting end plate 196 and mounting frame 197. Said mounting frame 197 extends from the level of the bottom of plate 196 to a point above the path of the cigars C and includes longitudinally spaced parallel vertical leading and trailing legs 199 and 200 joined at their tops by a cross leg 201. Helical compression springs 201a engage rails 193 and are entrapped between the confronting faces of plates 192 and 196 biased normally to urge carriage assembly 194 and support frame 197 forwardly. Plate 196 is connected at a medial point thereof by a rearwardly extending rod 202 to the piston of a hydraulic cylinder (not shown) actuated in a manner hereinafter described, said rod 202 being axially adjustable relative to the plate 196 by a threaded shank on the rod registering with an opening in the plate 196 and provided with opposing lock nuts along opposite faces of the plate.

Formed in frame legs 199 and 200 are upper and lower pairs of longitudinally axially aligned bores which longitudinally slidably engage and support upper and lower longitudinal slide rods 203 and 204 respectively positioned at levels above and below that of the path of the cigars C. An upper clamping jaw 206 is mounted on slide rod 203 and includes an upper block 207 provided with a longitudinal bore engaging the rod 203 and adjustably affixed thereto by set screws. A lower clamping jaw 208 is mounted on slide rod 204 and includes a block 209 provided with a longitudinal bore engaging rod 204 and adjustably affixed thereto by set screws. A leg 210 is integrally formed with and depends from the leading edge of upper block 207 into longitudinal sliding engagement with the top horizontal face of lower block 209, and a leg 211 is integrally formed with lower block 209 and is directed upwardly therefrom into longitudinal sliding engagement with the bottom horizontal face of upper block 207. Legs 210 and 211 and the confronting faces of the blocks 207 and 209 delineate a rectangular transversely extending clamping jaw opening 212 which is longitudinally extended and contracted between relatively open and closed positions with the corresponding longitudinal movement of jaws 206 and 208 and slide rods 203 and 204.

The front faces of jaw members 206 and 208 lie in a common vertical longitudinal plane. A vertical rectangular guide plate 213 parallel to the jaw members front faces is mounted at its upper edge on block 207 at a point above the underface thereof by means of an upper screw, and is spaced from the block 207 by a spacer collar 216 carried by screw 214 between block 207 and plate 213. The confronting faces of block 207 and plate 213 delineate a knife guide channel, the bottom edge of plate 213 being at the level of the bottom face of block 207. Secured to the inner face of frame leg 199, intermediate rods 203 and 204, is a cigar positioning plate 217 which is located in a vertical longitudinal plane forward of jaws 206 and 208 and is provided along its leading edge with a rearwardly directed leg 218 screw-secured to frame leg 199. The center-to-center longitudinal distance between positioning plate 217 and the pair of jaws 206 and 208 is equal to an advance increment of cigars C.

In order to effect the simultaneous movement of the jaws 206 and 208 alternately to their open and closed positions a vertically extending lever 219 is pivotally connected intermediate its ends to the front face of frame leg 200 intermediate the upper and lower slide rods 203 and 204 for rocking about a transverse axis. A longitudinal link 220 is suitably pivotally connected at opposite ends thereof to the upper end of lever 219 and the trailing end of upper slide rod 203 respectively, and a similar link 221 is likewise pivotally connected at opposite ends thereof to the lower end of lever 219 and the trailing end of lower slide rod 204 respectively. An arm 222 is integrally formed with and projects longitudinally from the midpoint of lever 219.

A vertical disposed hydraulic cylinder 223 is supported at its upper end by a horizontal bracket 224 suitably mounted on frame leg 201, cylinder 223 being in vertical alignment with and below the end of lever arm 222. Cylinder 223 is provided with a vertically actuated piston rod 226 the upper end of which is provided with a yoke 227 which is pivotally connected to the free end of lever arm 222. A split collar 228 is slidably adjustable along piston rod 226 and is releasably locked in position by a lock screw 229, collar 228 limiting the lower movement of piston rod 226 and hence the closed position of jaw 206 and 207.

A transverse horizontal axle 230 is mounted on and projects forwardly from support frame leg 200 below lever 219 and engages the trailing end of a longitudinal arm 231 for rocking up and down about axle 230. Also rotatably mounted on axle 230 are a pair of joined relatively large and small pulleys 232 and 233 respectively. A transverse horizontal shaft 234 is suitably journalled in arm 231 near the free end thereof and projects forwardly and rearwardly thereof. Mounted on the rear end of the shaft 234 for rotation therewith is a disc shaped cutter blade 236 having a flat rear face lying substantially in the plane of the front faces of clamp jaws 206 and 208 and a front face bevelled at its annular border to a sharp peripheral cutting edge 237. A pulley 238 is affixed to the front end of the shaft 234.

A pair of joined coaxial pulleys 239 and 240 are supported for rotation about a transverse axis on the rear face of frame plate 191 vertically below pulleys 232 and 233. It should be noted that pulleys 233 and 239 are relatively wide and are drive connected by a belt 241 which permits the relative transverse movement between pulleys 233 and 239. Pulley 232 is connected by a drive belt 242 to pulley 238 and pulley 240 is connected by a drive belt 243 to an electric drive motor 245 whereby blade 236 is rotated about its axis at high speed.

A vertical hydraulic cylinder 244 is mounted on the leading face of frame leg 199 vertically below the free end of arm 231 by means of a bracket 246 secured to the frame leg 199 and engaging the top of the cylinder 244. The cylinder includes a vertical actuating piston rod 247 provided with an upwardly directed coupling yoke 248 having horizontal slots 249 formed in the legs thereof and engaging a transverse pin 250 positioned adjacent the end of arm 231. A split collar 251 is adjustable along the length of piston rod 247 and is releasably locked in position by a lock screw 252 to limit the downward movement of rod 247. The raising of piston rod 247 by cylinder 244 moves blade 236 across the front faces of jaw members 206 and 208 and the clamp opening 212 delineated thereby and the lowering of piston rod 247 lowers and retracts blade 236 out of registry with clamp opening 212.

A vertical post 253 is secured to the rear face of frame end plate 192 and projects upwardly thereof and supports on its top, by means of a bracket 254, a transverse tubular guide member 256 in transverse axial alignment with jaw opening 212. A rod 257 is axially slidably engaged by guide 256 and projects forwardly and rearwardly thereof, said rod 257 being retained within guide 256 and restrained from rotation about its longitudinal axis by a pin 258 projecting diametrically through a transverse bore in rod 257 into sliding engagement with linear elongated slots 259 formed in opposite walls of the guide 256, pin 258 terminating in enlarged heads 260.

A mounting block 261 is suitably supported on the front end of slide rod 257 and is axially adjustable on the slide rod. A vertical gauging plate 262 is supported forward of the front face of block 261 by a leg 263 integrally formed with and projecting rearwardly from the bottom edge of gauging plate 262 into engagement with the underface of the block 261 to which it is screw fastened.

A vertically extending lever 264 is pivoted between its ends to the upper part of post 253 for rocking about a horizontal longitudinal axis. A collar 265 is fixed to the rear end of slide rod 257 and is provided with a longitudinally projecting headed pin 266 as shown in FIG. 24. A transversely extending bar 267 has its rear face contiguous with the vertical peripheral face of collar 265 and is provided in its rear section with an elongated slot 268 which slidably engages the pin 266. The forward end of bar 267 is pivotably connected to the upper end of the lever 264 by a pin 269 and is longitudinally spaced therefrom by a spacer sleeve 270 engaging pin 269 between bar 267 and lever 264. A helical tension spring 271 has its opposite looped ends engaging pin 266 and a pin 272 positioned on sleeve 270 to urge the slide rod resiliently forwardly until pin 266 engages the forward end of slot 268.

The lower end of the lever 264 is connected by a transverse turnbuckle rod 273 of adjustable length to carriage end plate 196. Thus, when carriage 194 is moved forwardly by rod 202, lever 264 is swung to move slide rod 257 and gauging plate 262 rearwardly by way of bar 267; and when carriage 194 is moved rearwardly by rod 202, lever 264 is swung to move bar 267 forwardly which in turn moves the slide rod 257 and gauging plate 262 forwardly by means of coupling spring 271. Connecting rod 202 and cylinders 223 and 244 are so timed and phased in a known manner relative to the movements of cigars C that, at the beginning of the rest period of the cigars C at the end of an advance increment, rod 202 is actuated to move rearwardly to move carriage 194 rearwardly and gauging plate 262 forwardly; cylinder 223 is then actuated to lower piston rod 226 and to close jaws 206 and 208; cylinder 244 is then actuated to move piston rod 247 upwardly and then downwardly to advance blade 236 across clamp opening 212 and then retract it from registry therewith; cylinder 223 is then actuated to raise piston rod 226 and open jaws 206 and 208 and the connecting rod is advanced to move carriage 194 forwardly and retract gauging plate 262. The above sequence or cycle is repeated during each rest period of cigars C.

Figure 27:
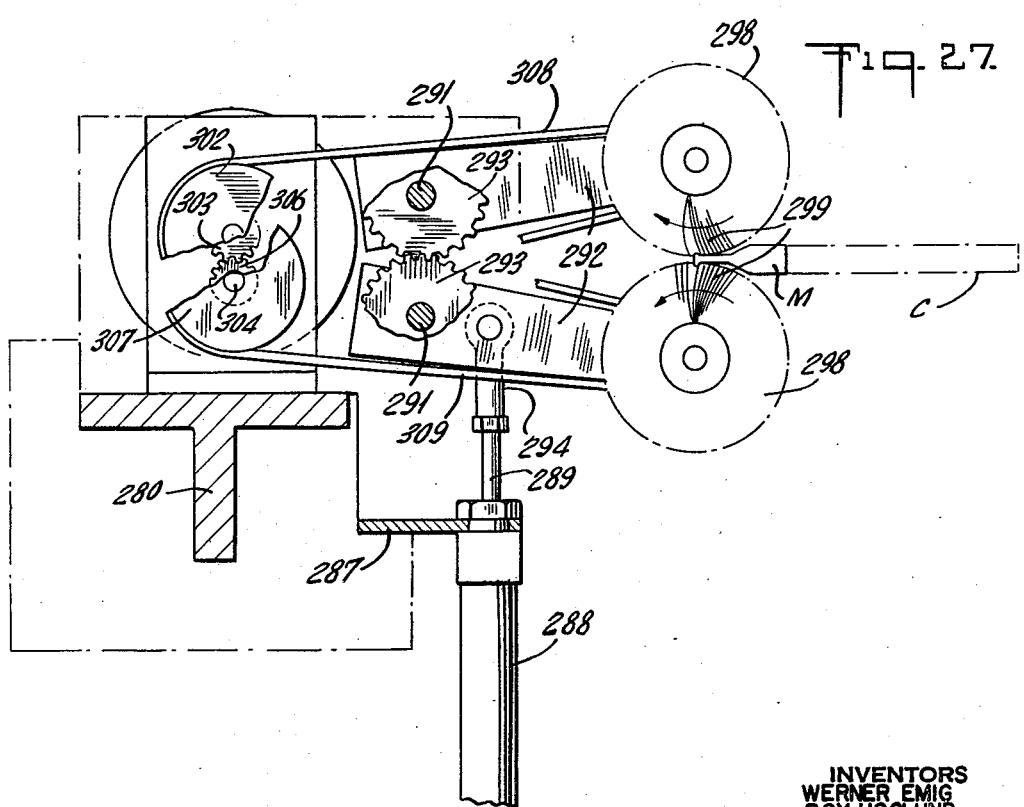
FIGURE 27 is a view similar to FIGURE 26 with the mechanism illustrated in a closed testing condition.

The mechanism 16 for testing the attachment of mouthpieces M to the cigars C is illustrated in FIGURES 25 and 27 and follows the sizing and trimming station 14 and is positioned rearwardly of the cigar path. Mechanism 16 includes a rearwardly located suitably supported longitudinally extending T-beam 280 atop the leading part of which is positioned a motor bracket 281. An electric motor 282 is mounted on bracket 281 and includes a horizontal longitudinal drive shaft 283. Also positioned on beam 280 and suitably secured thereto is a vertical transverse mounting plate 284 terminating at its front forward of the beam 280 in a depending leg section 286. Secured to the underface of leg 286 and projecting longitudinally forwardly thereof is a horizontal bracket plate 287 to the free end of which is mounted a depending vertical hydraulic cylinder 288 provided with an upwardly projecting actuated piston rod 289. A split collar 290 is releasably fixed to the piston rod 289 and adjustable along its length to limit the downward movement of the piston rod.

A pair of vertically spaced upper and lower longitudinal shafts 291 are suitably journalled to the forward part of plate 284 and have mounted thereon for swingable movement toward and away from each other a pair of forwardly projecting upper and lower arms 292. Also mounted on shafts 291 for swinging with arms 292 are a pair of similar meshing gears 293 whereby arms 292 concurrently swing toward and away from each other. Piston rod 289 terminates in a yoke member 294 which is pin connected to the lower arm 292 between its ends so that the raising of piston rod 289 effects the concurrent swinging of arms 292 toward each other and the lowering of the piston rod 289 separates arms 292.

The free ends of arms 292 terminate in parallel longitudinal bearing sleeves 296 in which are journalled vertically spaced parallel shafts 297 which project beyond opposite ends of the sleeves. Affixed to the trailing end of each shaft 296 is a similar coaxial bristle wheel 298 of known type including a shaft engaging hub section 299 and radially projecting flexible bristles 299 the ends of which delineate a cylindrical surface. Upper and lower pulleys 300 and 201 respectively are affixed to the leading ends of the upper and lower shafts 297 and are longitudinally offset relative to each other. A first upper pulley 302 transversely aligned with upper pulley 300 is affixed to motor shaft 283 as is a gear 303. A longitudinal shaft 304 is suitably journalled below shaft 297 and has mounted thereon a gear 306 similar to and meshing with gear 303. A lower pulley 307 in transverse alignment with the lower pulley 301 is coaxially affixed to gear 306 for rotation therewith. A belt 308 drive-couples pulleys 300 and 302 and a belt 309 drive-couples the pulleys 301 and 307. Thus motor 282 through the gears, pulleys and belts rotates the transversely coplanar wire wheels in opposite directions so that their confronting peripheries move rearwardly and are positioned in vertical alignment above and below the free end section of a mouthpiece M on a registering cigar C during the rest period thereof.

The operation of the improved apparatus 10 and the practice of the improved method is clear from the above description. The cigars C which are illustrated as being of substantially square transverse cross-section are produced in a continuous manner, pressed to a square shape and fed to the trailing end of conveyor 17 and are advanced along platform 18 by the horizontally and vertically reciprocating rake members 19. The cigars C are retained along platform 18 by pad 341 in regularly longitudinally spaced positions extending transversely and being uniformly transversely positioned by guide plate 326. Each cigar C is subjected to the same sequential steps and operations. After a cigar C is advanced to a rest position in registry with open crush jaws 61 and 72, the carriage 36 is advanced to its forward position to bring the open jaws to positions above and below the tip section of the cigar C and concurrently to depress pad 341 through the motivating coupling arrangement. Cylinder 69 is then actuated to lower piston rod 71 and close jaws 61 and 72 about the cigar tip to effect the crushing and partial flattening thereof without rupturing the binding and wrapper so that the tip of the cigar is susceptible to subsequent shaping. Any portion of the cigar tip, particularly filler, which is pressed outwardly through the rear opening between jaws 61 and 72 is cut and trimmed off by knife 110 which is swung across the rear jaw opening subsequent to the closing thereof by the reciprocation of upper rocker plate 80 by cylinder 103 which is actuated after the actuation of cylinder 69.

Crushing jaws 61 and 72 are then opened by the cylinder 69 and carriage 36 retracted and pad 341 raised, and the cigar with its crushed relatively wide tip is advanced into axial alignment with the first piercing needle 138 and with the first set of heated compression jaws 116 and 117. Carriage 36 is then advanced to depress pad 341 and advance the heated piercing needle axially into the tip of the cigar C. Thereafter cylinder 103 is actuated to raise piston rod 104 and slide upper and lower rocker plates 80 and 81 longitudinally forwardly and rearwardly, respectively, and to swing their front sections toward each other whereby to effect the longitudinal and vertical closing of jaws 116 and 117 about the cigar tip to effect the cylindrical shaping, compression and heating thereof. Jaws 116 and 117 are then opened and carriage 36 retracted and pad 341 raised. The cigar C is then advanced along platform 18 one or more increments to the next successive set of jaws 116 and 117 and then to the following set of jaws 116 and 117, the piercing-shaping, compression and heating cycle being performed at each set of jaws 116 and 117 so that a substantially permanent set is effected of the cigar tip as it traverses the shaping station 11 and an axial passageway is formed in the cigar tip.

At the adhesive applying station 12 the circumferential band B of adhesive is applied to the cigar tip T in the manner described above and at a subsequent rest period of the cigar C a mouthpiece M is applied to the tip T and is secured thereto by the adhesive band B.

The tipped cigar C is then advanced into axial alignment with the gauging plate 262 and clamp jaws 206 and 208. When the cigar C comes to rest, carriage 194 is moved rearwardly to bring the clamp jaws into registry with the free end section of the cigar C and gauging plate 262 is advanced forwardly to engage the mouthpiece M and push the cigar C to a predetermined transverse position. Thereafter the cylinder 223 is actuated to close the jaws 206 and 208 and the cylinder 244 is then actuated to swing rotating blade 237 across the forward end of the cigar C to cut and trim the cigar C to a desired length and provide an end face of optimum texture.

Following the trimming and sizing of the cigar C jaws 206 and 208 are opened and the gauging plate 262 and the jaw and blade assembly are transversely retracted and the trimmed cigar C transported through one or more increments into a rest position with the cigar carried mouthpiece M located between the confronting faces of the rotating bristle wheels 298. Cylinder 288 is then actuated to contract arms 292 and bring the wheel surfaces into engagement with the upper and lower faces of the mouthpiece M and apply a rearward transverse force to the mouthpiece M axially away from the cigar C. If the mouthpiece M is satisfactorily secured to the cigar C, the axial force applied thereto is insufficient to separate it from the cigar C but if the securement is inadequate, the force applied by the wheels 298 will pull the mouthpiece M from the cigar C and discharge it rearwardly. The axial pulling force may be adjusted to the desired value by varying the separation of the wheels 298 in their closed position or by using different grades and types of bristles. The tested cigars C are then discharged from the apparatus for further handling such as wrapping, packaging, boxing or the like.

While there has been described and illustrated a preferred embodiment of the present invention, it is apparent that numerous alterations, omissions and additions may be made without departing from the spirit thereof.

What is claimed is:

1. A cigar tipping apparatus comprising means for transversely compressing and releasing an end section of a cigar a plurality of times to effect a modification in the transverse dimensions thereof, means for applying a mouthpiece to said modified cigar end section, and means for applying a predetermined longitudinal separating force between said mouthpiece and said cigar following the application of said mouthpiece to said cigar.

2. The apparatus of claim 1, including means for applying an adhesive to said cigar end section following the reduction in the transverse dimensions thereof prior to the application of said mouthpiece.

3. The apparatus of claim 1 wherein said compressing means comprises a plurality of sets of jaws, means for advancing and retracting the jaws of each of said sets toward and away from each other to a closed and open position respectively and means for advancing a cigar into successive registry with said jaw sets.

4. The apparatus of claim 1, including means for heating said cigar end section during said compression thereof.

5. The apparatus of claim 1, including means for transversely crushing said cigar end section prior to said compression thereof, said crushing means including opposing jaws and means for urging said jaws toward each other to a closed position and for retracting said jaws, and means for trimming the free end of said cigar end section when said crushing jaws are in said closed position.

6. The apparatus of claim 1, including a piercing needle and means for axially inserting and retracting said piercing needle in said cigar end section and supporting said needle therein during the compression thereof.

7. The apparatus of claim 1, including means for trimming the end of said cigar opposite said mouthpiece carrying end section following the application of said mouthpiece.

8. The apparatus of claim 1, including means for intermittently longitudinally advancing regularly longitudinally spaced transversely extending cigars along a predetermined path from a trailing toward a leading end thereof with said cigar end sections freely projecting from said advancing means, said compression means comprising a support member transversely offset and transversely movable relative to said cigar path and a plurality of sets of compression jaws mounted on said support member, the longitudinal spacing between adjacent sets of said jaws being an integral multiple of that between adjacent cigars, means for transversely advancing said support member and said jaw sets into an advanced position in registry with respective ends of said cigar end sections and contracting the jaws of said jaw sets during the rest periods of said cigars and then expanding said jaws and transversely retracting said support member and jaw sets out of registry with said cigars.

9. The apparatus of claim 8, including a pair of opposing crushing jaws mounted on said support member at a position trailing the trailing compression jaw set an integral multiple of the inter-cigar spacing and transversely movable with said support member into and out of registry with a cigar end section, and means for contracting said crushing jaws when said support member is in its advanced position.

10. The apparatus of claim 8, wherein each of said jaw sets comprises a pair of upper and lower opposite complementary jaw members having top and bottom compression sections respectively with longitudinally confronting opposite arcuate concave compression faces and upper and lower guide sections extending longitudinally from the top and bottom of said top and bottom compression sections respectively toward the opposite compression sections, and including means for supporting said jaw members for vertical and longitudinal movement toward each other to a contracted position and away from each other to an open position.

11. The apparatus of claim 8, wherein each of said jaw sets comprises a pair of upper and lower complementary jaw members having compression sections with longitudinally confronting arcuate concave compression faces and upper and lower guide sections extending longitudinally from the top and bottom of said top and bottom compression sections respectively toward the opposite compression sections, said jaw members being supported for vertical and longitudinal movement toward each other to a contracted position and away from each other to an open position and said jaw contracting means comprises means for longitudinally moving said jaw members between longitudinally open and closed positions, a cam mounted for movement with one of said jaw members and a follower mounted for movement with the other of said jaw members and engaging said cam whereby the longitudinal movement of said jaw members to longitudinally open and closed positions effects the vertical movement thereof vertically to open and closed positions respectively.

12. The apparatus of claim 8, including a heating element in heat transfer relationship with each of said compression jaws.

13. A cigar tipping apparatus comprising means for intermittently longitudinally advancing regularly longitudinally spaced transversely extending cigars along a predetermined path with said cigar end sections freely projecting from said advancing means, compression means for transversely modifying said cigar end sections comprising a support member transversely offset and transversely movable relative to said cigar path and a plurality of sets of compression jaws mounted on said support member, the longitudinal spacing between adjacent sets of said jaws being an integral multiple of that between adjacent cigars, means for transversely advancing said support member and said jaw sets into an advanced position in registry with respective ends of said cigar end sections and contracting the jaws of said jaw sets during the rest periods of said cigars and then expanding said jaws and transversely retracting said support member and jaw sets out of registry with said cigars, means following said compression means for applying mouthpieces to said modified cigar end sections, and trimming the free end of a cigar following the application of said mouthpiece, said last referred to means comprising a set of clamp jaws movable between open and closed positions, means for relatively axially moving said cigar and said clamp jaws during the longitudinal rest interval of said cigar to bring the free ends of said cigar and jaws into registry and then closing said clamp jaws, said trimming means including a rotating blade for trimming the free end of said cigar.

14. A cigar tipping apparatus comprising means for intermittently longitudinally advancing regularly longitudinally spaced transversely extending cigars along a predetermined path with said cigar end sections freely projecting from said advancing means, compression means for transversely modifying said cigar end sections comprising a support member transversely offset and transversely movable relative to said cigar path and a plurality of sets of compression jaws mounted on said support member, the longitudinal spacing between adjacent sets of said jaws being an integral multiple of that between adjacent cigars, means for transversely advancing said support member and said jaw sets into an advanced position in registry with respective ends of said cigar end sections and contracting the jaws of said jaw sets during the rest periods of said cigars and then expanding said jaws and transversely retracting said support member and jaw sets out of registry with said cigars, means following said compression means for applying mouthpieces to said modified cigar end sections, means for trimming the free ends of a cigar following the application of said mouthpiece comprising a transversely movable support member, a set of clamp jaws mounted on said support member and transversely movable therewith and mutually relatively movable between opened and closed positions, a transversely movable gauging member in axial alignment with said clamp jaws, means for advancing said gauging member to a predetermined position into end engagement with the mouthpiece of a registering cigar, and means for closing said clamp jaws about said cigar rearwardly of the free end thereof following the advance of said gauging member, said trimming means including means for trimming said free end of said cigar while engaged by said clamp jaws.

15. A cigar tipping apparatus comprising means for transversely compressing and releasing an end section of a cigar to effect a modification in the transverse dimensions thereof, means for applying a mouthpiece to said modified cigar end section, and means for applying a predetermined longitudinal separating force between said mouthpiece and said cigar following the application of said mouthpiece to said cigar.

References Cited
UNITED STATES PATENTS

| | | | |
|---|---|---|---|
| 1,964,052 | 6/1934 | Halstead | 131—91 |
| 2,307,738 | 1/1943 | Alm | 131—91 X |
| 2,827,904 | 3/1958 | Halstead | 131—88 |
| 3,266,498 | 8/1966 | Oppenheimer et al. | 131—83 X |
| 3,269,393 | 8/1966 | Ackermann | 131—91 X |
| 3,398,753 | 8/1968 | Stelzer | 131—88 |

OTHER REFERENCES

Arenco, 1,941,643, June 1966, Germany.

SAMUEL KOREN, Primary Examiner
JAMES H. CZERWONKY, Assistant Examiner

U.S. Cl. X.R.

131—89, 90, 91, 92